(12) United States Patent
Nagaoka

(10) Patent No.: US 9,176,606 B2
(45) Date of Patent: Nov. 3, 2015

(54) HANDWRITING INPUT SYSTEM

(71) Applicant: Panasonic Corporation, Osaka (JP)

(72) Inventor: Eiichi Nagaoka, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 278 days.

(21) Appl. No.: 14/014,779

(22) Filed: Aug. 30, 2013

(65) Prior Publication Data

US 2014/0062964 A1 Mar. 6, 2014

(30) Foreign Application Priority Data

Sep. 4, 2012 (JP) ................................. 2012-193786
Jun. 26, 2013 (JP) ................................. 2013-133603

(51) Int. Cl.
*G06F 3/0354* (2013.01)
*G06F 3/03* (2006.01)

(52) U.S. Cl.
CPC .......... *G06F 3/03545* (2013.01); *G06F 3/0321* (2013.01)

(58) Field of Classification Search
CPC .............. G06F 3/0321; G06F 3/03545; G06F 3/03542; G06F 3/0386; G06F 3/038
USPC ...................... 345/173–179; 178/18.01–18.09
See application file for complete search history.

(56) References Cited

U.S. PATENT DOCUMENTS

| | | | | |
|---|---|---|---|---|
| 6,330,976 B1 * | 12/2001 | Dymetman et al. | .......... | 235/487 |
| 2005/0147281 A1 * | 7/2005 | Wang et al. | ................... | 382/119 |
| 2005/0201621 A1 | 9/2005 | Wang et al. | | |
| 2006/0154559 A1 | 7/2006 | Yoshida | | |
| 2008/0025612 A1 | 1/2008 | Wang et al. | | |
| 2008/0095440 A1 | 4/2008 | Onishi et al. | | |
| 2010/0085471 A1 * | 4/2010 | Craven-Bartle | ............... | 348/371 |
| 2011/0130096 A1 | 6/2011 | Dunkars | | |
| 2012/0006898 A1 * | 1/2012 | Rezende | .................. | 235/472.03 |
| 2012/0263381 A1 | 10/2012 | Yoshida | | |
| 2013/0321351 A1 * | 12/2013 | Paul et al. | ...................... | 345/179 |
| 2014/0160092 A1 * | 6/2014 | Tseng | ........................... | 345/182 |

FOREIGN PATENT DOCUMENTS

| | | |
|---|---|---|
| JP | 2003-511762 T | 3/2003 |
| JP | 2006-141061 A | 6/2006 |
| JP | 2007-226577 A | 9/2007 |
| JP | 2009-181341 A | 8/2009 |

(Continued)

*Primary Examiner* — Amare Mengistu
*Assistant Examiner* — Stacy Khoo
(74) *Attorney, Agent, or Firm* — Renner, Otto, Boisselle & Sklar, LLP

(57) ABSTRACT

Dot mark decoding circuitry sets an initial value of a relative position of each of dot marks with respect to a corresponding lattice point; and then sequentially executes, in repetition, a calculation process of calculating a projective transformation matrix based on a position of each dot mark in a pixel coordinate system and a position obtained by adding the relative position to the position of a corresponding lattice point; a transformation process of transforming the position of each dot mark from the position in the pixel coordinate system to a position in a L coordinate system using the projective transformation matrix; a generation process of generating the relative position information based on the post-transformation position of each dot mark and the position of the corresponding lattice point; and an update process of updating the relative position in accordance with the relative position information.

8 Claims, 23 Drawing Sheets

(56) References Cited

FOREIGN PATENT DOCUMENTS

| | | |
|---|---|---|
| JP | 2009-230438 A | 10/2009 |
| JP | 2009-245252 A | 10/2009 |
| JP | 2012-128563 A | 7/2012 |
| JP | 2012-155373 A | 8/2012 |
| WO | WO 01/26033 A1 | 4/2001 |

* cited by examiner (a)

(b)

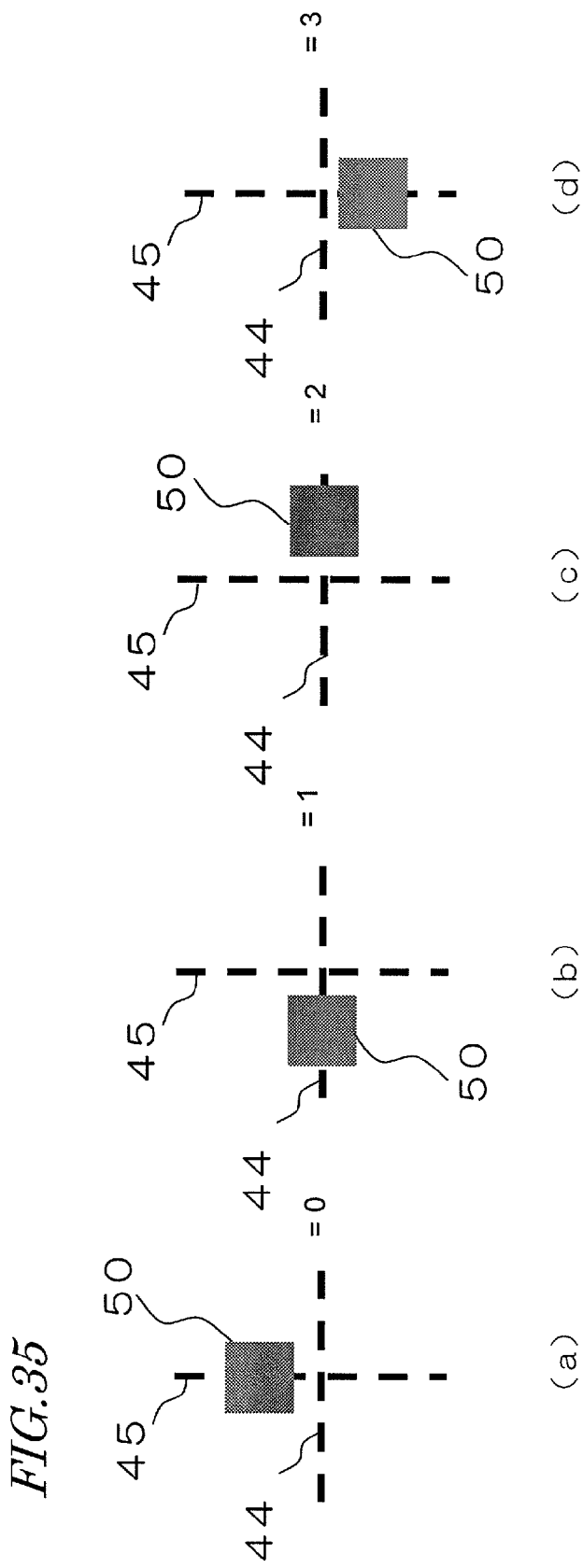

HANDWRITING INPUT SYSTEM

BACKGROUND

1. Technical Field

The present disclosure relates to an electronic pen and a handwriting input system using the same.

2. Description of the Related Art

Japanese Laid-Open Patent Publication No. 2007-226577 discloses a technology by which for writing a letter or the like on a sheet of paper on which a great number of dot marks obtained by coding positions are located by printing or the like, information provided on the sheet of paper is made electronic data by use of an electronic pen and the information made the electronic data is sent to a server or a terminal. Japanese Laid-Open Patent Publication No. 2012-128563 discloses a handwriting input system by which a great number of dot marks obtained by coding positions are located on a digital display or the like and handwriting input is performed on the digital display by use of an electronic pen.

SUMMARY

The present disclosure provides a handwriting input system capable of providing more accurate position information on a dot mark.

A handwriting input system according to one embodiment of the present disclosure determines a designated position which is designated by a user on a display plane. The designated position is associated with a plurality of dot marks. The plurality of dot marks are a part of a great number of dot marks on the display plane and are formed with respect to a plurality of virtual points. A position of one of the plurality of dot marks is coded by the plurality of dot marks. The handwriting input system specifies the position by reading the plurality of dot marks. The handwriting input system includes an image sensor configured to capture an image of the plurality of dot marks; dot mark position detecting circuitry configured to detect positions of the plurality of dot marks in an image which has been captured as positions in a first coordinate system of the image; decoding circuitry configured to generate relative position information based on the positions of the plurality of dot marks which is detected by the dot mark position detecting circuitry and positions of the plurality of virtual points, wherein a second coordinate system different from the first coordinate system is defined by the plurality of virtual points, the relative position information represents a positional relationship of a plurality of dot marks in the second coordinate system with respect to the plurality of virtual points, and the plurality of dot marks in the second coordinate system correspond to the plurality of dot marks in the first coordinate system; and position information calculating circuitry configured to calculate a position on the display plane based on the relative position information. The decoding circuitry is configured to set initial values of relative positions of the plurality of dot marks with respect to the plurality of virtual points; then execute a calculation process of calculating a projective transformation matrix based on the positions of the plurality of dot marks in the first coordinate system and positions obtained by adding the relative positions to the positions of the virtual points; execute a transformation process of transforming the positions of the plurality of dot marks from the positions in the first coordinate system to the positions in the second coordinate system by use of the projective transformation matrix; execute a generation process of generating the relative position information based on the post-transformation positions of the plurality of dot marks and the positions of the virtual points; execute an update process of updating the relative positions in accordance with the relative position information; and sequentially execute the calculation process, the transformation process, the generation process and the update process in repetition until a prescribed condition is fulfilled.

According to the present disclosure, a handwriting input system capable of providing more accurate position information on a dot mark can be provided.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 35 shows positional arrangement patterns of the dot marks 50.

DETAILED DESCRIPTION

Hereinafter, preferred embodiments will be described in detail with reference to the drawings when necessary. Descriptions which are unnecessarily detailed may not be provided. For example, a detailed description of a matter which is already well known or an overlapping description on substantially the same elements may be omitted. This is for avoiding the following description from unnecessarily redundant and thus for allowing a person of ordinary skill in the art to understand the disclosure easily.

The inventor provides the attached drawings and the following description in order to allow a person of ordinary skill in the art to fully understand the present disclosure, and does not intend to limit the subject matter of the claims by the attached drawings or the following description.

(Embodiment 1)

Hereinafter, Embodiment 1 will be described with reference to FIG. 1 through FIG. 31.

1. Configuration

[1-1. Configuration of a Handwriting Input System]

First, an overview of a handwriting input system 100 will be described with reference to FIG. 1.

Figure 1:
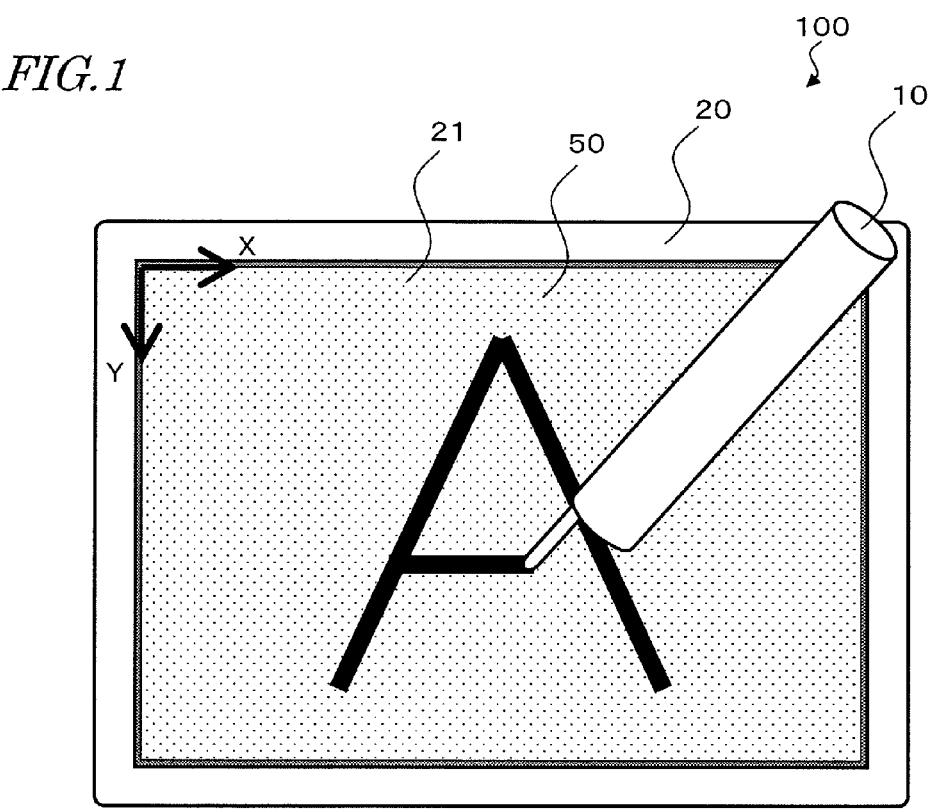
FIG. 1 is a schematic view showing a state where a user uses an electronic pen 10 and a handwriting input system 100.

FIG. 1 shows a situation where a user is inputting a letter to a display plane 21 of a display device 20 by use of an electronic pen 10. A letter is input herein, but what can be input to the display plane 21 is not limited to a letter, and a numerical figure or a symbol, for example, can be input.

The handwriting input system 100 in Embodiment 1 includes the electronic pen 10 and the display device 20. The electronic pen 10 is used as a data input device of the handwriting input system 100. When the user writes a letter on the display plane 21 by use of the electronic pen 10, the written letter is displayed on the display plane 21.

On the display plane 21, a great number of dot marks, obtained by coding positions on the display plane 21, are formed in advance as various information patterns in correspondence to the respective positions. In this specification, individual dot marks are expressed as "dot marks 50" as shown in FIG. 1.

Now, with reference to FIG. 34 and FIG. 35, information patterns will be described.

Figure 34:
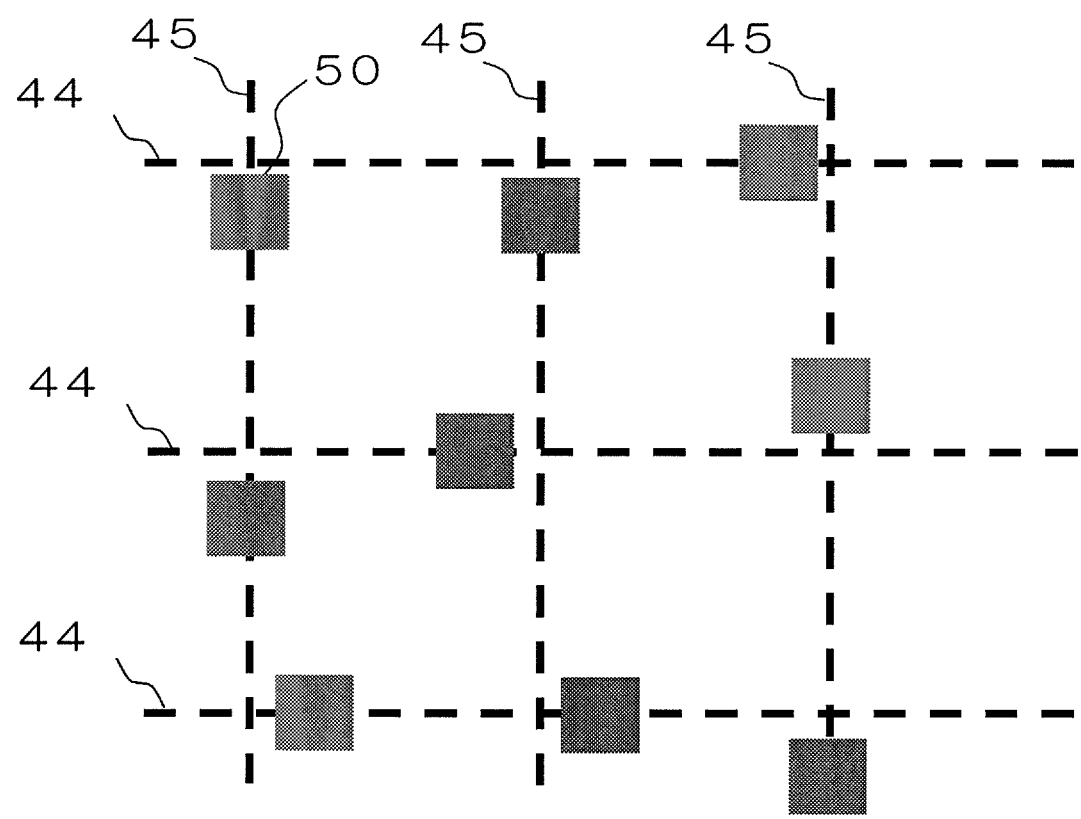
FIG. 34 is an enlarged view of a display plane 21 on which dot marks 50 are formed.

FIG. 34 is an enlarged view of the display plane 21 having the dot marks 50 formed thereon.

The dot marks 50 each have, for example, a quadrangular (square) or circular shape and contain a main component absorbing infrared rays.

The dot marks 50 are located in the vicinity of virtual lattice points (virtual points). The virtual lattice points are defined by intersections of first reference lines 44 and second reference lines 45. The first reference lines 44 and the second reference lines 45 are virtual lines on the display plane 21 and do not exist in reality. Therefore, lattice points do not exist on the plane.

The plurality of first reference lines 44 and the plurality of second reference lines 45 form a lattice pattern. FIG. 34 shows an example of lattice pattern. Three first reference lines 44 and three second reference lines 45 form a 2×2 lattice pattern. In the vicinity of the virtual lattice points, 3×3 dot marks 50 are formed. Hereinafter, the "virtual lattice points" will be referred to simply as the "lattice points".

FIG. 35 shows positional arrangement patterns of a dot mark 50. The dot mark 50 is located at a position offset from the lattice point in any of four directions defined by the first and second reference lines 44 and 45. Specifically, the dot mark 50 may be arranged as shown in either of portions (a) through (d) of FIG. 35. Each positional arrangement is assigned either one of different codes of "0", "1", "2" and "3" and thus is digitized.

In the positional arrangement of portion (a) of FIG. 35, the dot mark 50 is located upward with respect to the intersection of the first reference line 44 and the second reference line 45. For being digitized, this positional arrangement is represented by code "0". In the positional arrangement of portion (b) of FIG. 35, the dot mark 50 is located leftward with respect to the intersection of the first reference line 44 and the second reference line 45. For being digitized, this positional arrangement is represented by code "1". In the positional arrangement of portion (c) of FIG. 35, the dot mark 50 is located rightward with respect to the intersection of the first reference line 44 and the second reference line 45. For being digitized, this positional arrangement is represented by code "2". In the positional arrangement of portion (d) of FIG. 35, the dot mark 50 is located downward with respect to the intersection of the first reference line 44 and the second reference line 45. For being digitized, this positional arrangement is represented by code "3".

In this embodiment, positions on the display plane 21 are coded by a combination of 6×6 dot marks 50. In this embodiment, the term "information pattern" refers to a pattern formed of all the dot marks existing on the display plane 21, namely, a great number of dot marks 50 on the display plane 21, and the term "dot pattern" refers to a pattern formed of 6×6 dot marks 50, which is a part of the great number of dot marks 50 on the display plane 21.

Now, any 6×6 dot marks 50 will be discussed. The 6×6 dot marks 50 form a dot pattern, and a position on the display plane 21 is coded by the dot pattern. The dot patterns coding different positions on the display plane 21 are all different so that the position on the display plane 21 is specified by decoding the dot pattern. 36 dot marks included in each dot pattern are each assigned either one of codes of "0" through "3", and as a result, a huge number ($4^{6 \times 6}$) of positional coordinates on the display plane 21 can be coded.

As a method for patterning (coding) such an information pattern or specifying a positional coordinate (decoding), a known method disclosed in, for example, Japanese Laid-Open Patent Publication No. 2006-141061 is usable.

It is sufficient as long as a dot pattern is decoded to specify the position on the display plane 21, and the method for arranging the dot marks included in the dot pattern with respect to the lattice points is not limited to the above-described method. For example, the position of the dot mark 50 may be shifted in any of four directions rotated by 45 degrees from the first reference line 44 and the second reference line 45.

The electronic pen 10 reads, by a sensor, a dot pattern including a part of the information pattern, namely, a plurality of dot marks 50, and as a result, the position of the letter written by the user on the display plane 21 can be specified. In this manner, the electronic pen 10 also acts as a read device of information patterns.

The electronic pen 10 reads information patterns one after another while moving. Based on the information patterns which have been read, the trace of the electronic pen 10, namely, the pen stroke of the letter written by the user can be detected. Position information (information on the trace of the letter) detected in this manner is transmitted to the display device 20. Based on this position information, the display device 20 displays letter information on the display plane 21. Therefore, the user can write a letter or the like on the display plane 21 by use of the electronic pen 10 in a manner of writing a letter or the like on a sheet of paper by use of a pen.

The user can also erase the written letter by use of the electronic pen 10. The user can use the electronic pen 10 as an eraser. In this case also, like in the case where a letter is written, the electronic pen 10 reads the information pattern to specify the position of the tip of the electronic pen 10. Based on the specified position information, the display device 20 changes the letter information to be displayed on the display plane 21.

[1-2. Configurations of the Electronic Pen and the Display Device]

Figure 2:
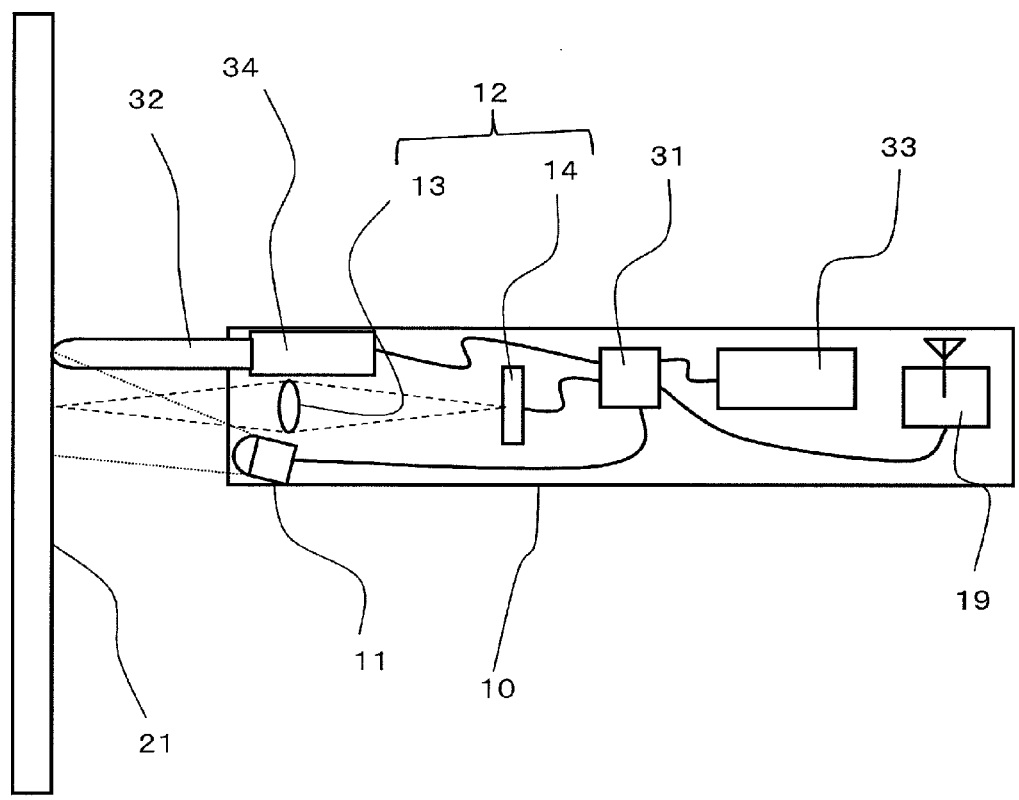
FIG. 2 is a hardware structural view of the electronic pen 10.
Figure 3:
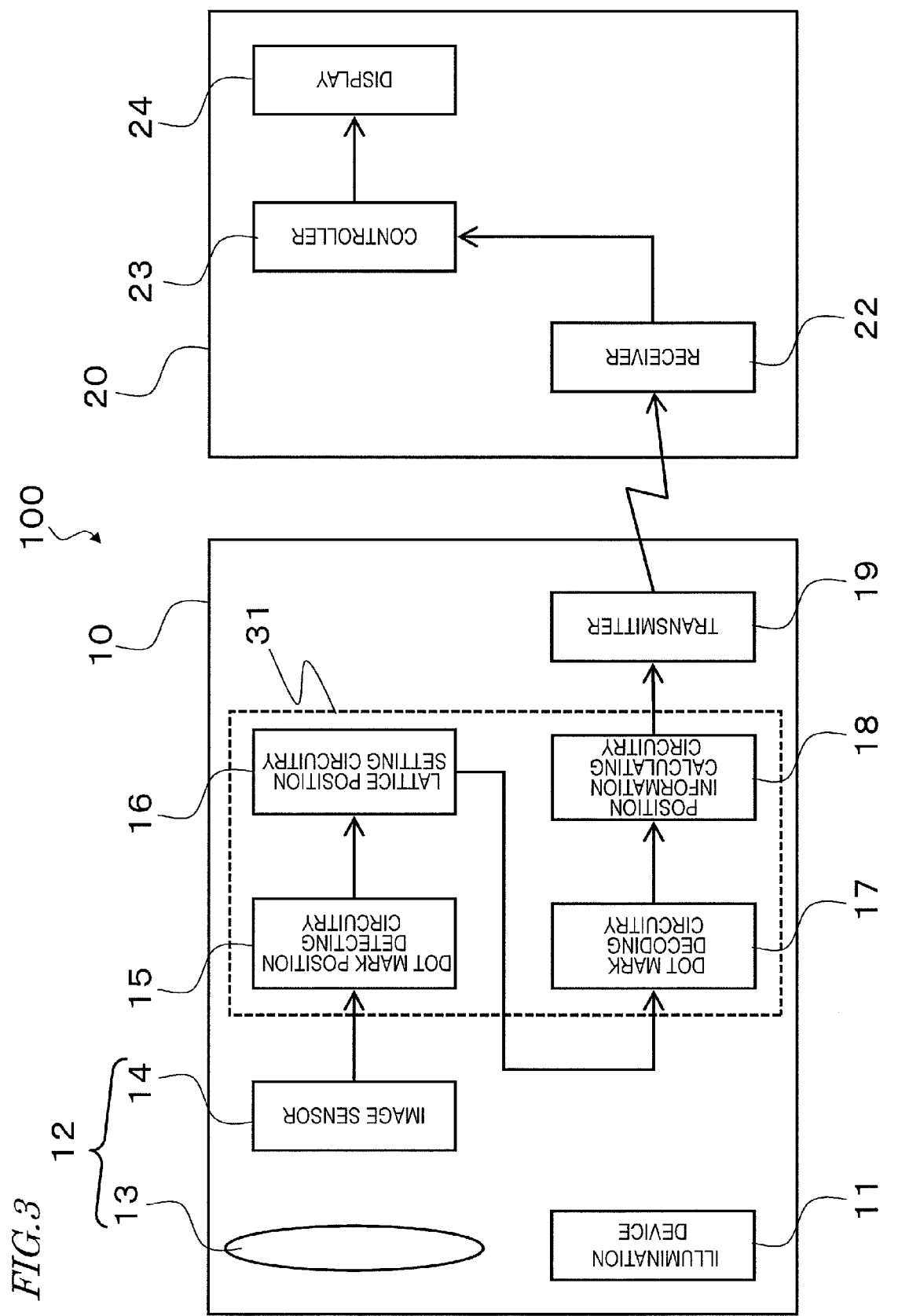
FIG. 3 is a block diagram showing a configuration of the handwriting input system 100.

With reference to FIG. 2 and FIG. 3, configurations of the electronic pen 10 and the display device 20 will be described.

First, with reference to FIG. 2, a hardware configuration of the electronic pen 10 will be described. FIG. 2 is a hardware structural view of the electronic pen 10.

As shown in FIG. 2, the electronic pen 10 includes an illumination device 11, an objective lens 13, an image sensor 14, a transmitter 19, a controller 31, a pen tip section 32, a power circuit 33, and a pen pressure sensing device 34.

The illumination device 11 includes a light emitting element such as, for example, an LED element. A plurality of LED elements may be provided. In this case, the plurality of LED elements are located to illuminate, generally uniformly, a shooting region on the display plane 21 that is to be shot by the image sensor 14 via the objective lens 13. For example, two LED elements are located in the vicinity of the pen tip section 32 so as to illuminate the shooting region on the display plane 21 generally uniformly, and are allowed to emit light at the same time or alternately.

The illumination device 11 emits infrared light to an information pattern. The infrared light has a wavelength of, for example, 850 nm or longer, which is in a wavelength range of far-infrared rays. The infrared light emitted from the illumination device 11 is absorbed by the dot marks 50 while being reflected by an region other than the dot marks 50.

The objective lens 13 forms an optical image with the infrared light, reflected by the display plane 21, at the image sensor 14.

The image sensor 14 is, for example, a COD or CMOS sensor. The image sensor 14 is provided on an optical axis of the objective lens 13. The image sensor 14 detects the optical image formed via the objective lens 13 and thus forms an image.

Elements including the objective lens 13 and the image sensor 14 form an imaging section 12. The imaging section 12 may include a plurality of lenses in addition to the objective lens 13.

The imaging section 12 can optically shoot at least a part of the great number of dot marks 50 as an image. The imaging section 12 forms an image with the infrared light which has been absorbed by the dot marks 50 while being reflected by an region other than the dot marks 50. More specifically, the imaging section 12 detects a plurality of dot marks 50 formed on an imaging area of the image sensor 14. In this manner, the imaging section 12 generates an image formed of the plurality of dot marks 50. The imaging section 12 transmits the generated image to the controller 31.

The transmitter 19 is provided in the vicinity of an end of the electronic pen 10 opposite to the pen tip section 32. The transmitter 19 transmits information including computational results obtained by the controller 31 to the display device 20.

The controller 31 is a microcomputer including a CPU, a memory and the like. The controller 31 also includes a program to operate the CPU. The controller 31 may be realized by only hardware or by a combination of hardware and software.

The controller 31 controls the entirety of the electronic pen 10.

The pen tip section 32 may be shaped such that, for example, the user can easily recognize the letter displayed on the display plane 21. In the vicinity of the pen tip section 32, the objective lens 13 and the illumination device 11 are provided.

The power circuit 33 supplies electric power to the elements of the electronic pen 10.

The pen pressure sensing device 34 includes, for example, a pen pressure sensor. The pen pressure sensor detects, for example, a change in a resistance value of a conductive rubber member or a change in an electrostatic capacitance between electrodes. The pen pressure sensing device 34 senses a pressure applied to the pen tip section 32 when, for example, the user writes a letter or the like on the display plane 21 by use of the electronic pen 10. The sensing results of the pressure are transmitted to the controller 31. The controller 31 transmits the sensing results of the pressure, transmitted from the pen pressure sensing device 34, to the transmitter 19, and the transmitter 19 transmits the results to the display device 20.

Now, with reference to FIG. 3, a configuration of the controller 31 and a configuration of the display device 20 will be described.

The controller 31 includes dot mark position detecting circuitry 15, lattice position setting circuitry 16, dot mark decoding circuitry 17 and position information calculating circuitry 18.

In this embodiment, functions of the dot mark position detecting circuitry 15, the lattice position setting circuitry 16, the dot mark decoding circuitry 17 and the position information calculating circuitry 18 are implemented as programs of the controller 31.

In the case where the functions of the dot mark position detecting circuitry 15, the lattice position setting circuitry 16, the dot mark decoding circuitry 17 and the position information calculating circuitry 18 are implemented by hardware, these elements may be implemented on, for example, an image signal processor instead of the controller 31.

The dot mark position detecting circuitry 15 detects positions of all the dot marks 50 included in an image shot by the imaging section 12 and transmits the detection results to the lattice position setting circuitry 16.

The lattice position setting circuitry 16 selects a plurality of dot marks 50 used to form a dot pattern from the dot marks 50 included in the image. The lattice position setting circuitry 16 also calculates positions on the display plane 21 of lattice points 50a respectively corresponding to the selected dot marks 50. The lattice position setting circuitry 16 transmits the selection results of the dot marks 50 and the calculation results of the positions on the display plane 21 of the corresponding lattice points 50a to the dot mark decoding circuitry 17.

From the positions of the dot marks 50 in the shot image and the positions of the lattice points 50a on the display plane 21, the dot mark decoding circuitry 17 generates relative position information. The relative position information represents the positional relationship of the dot marks 50 with respect to the lattice positions 50a. The relative position information will be described later in more detail.

The dot mark decoding circuitry 17 calculates a projective transformation matrix H used to transform the positions of the dot marks 50 in the shot image to the positions of the dot marks 50 on the display plane 21 on which the information pattern is formed in advance. The relative position information on each of the dot marks 50 included in the dot pattern and the calculation results of the projective transformation matrix H are transmitted to the position information calculating circuitry 18.

The position information calculating circuitry 18 uses the relative position information on each of the dot marks 50 to calculate position information on each of the dot marks 50 on the display plane 21. The position information calculating circuitry 18 also uses the projective transformation matrix H to calculate a position on the display plane 21 of a tip of the electronic pen 10. Owing to this, it can be specified at which position on the display plane 21 the tip of the electronic pen 10 is located. The position information of the dot marks 50 on the display plane 21 and the position information of the tip of the electronic pen 10 on the display plane 21 are transmitted to the transmitter 19.

As shown in FIG. 3, the display device 20 includes a receiver 22, a controller 23, and a display 24. The display device 20 is, for example, a liquid crystal display. The display 24 is an example of display panel of the liquid crystal display.

The receiver 22 receives information transmitted from the transmitter 19 of the electronic pen 10. The received information includes the calculation results provided by the position information calculating circuitry 19 of the electronic pen 10. The receiver 22 transmits the received information to the controller 23.

The controller 23 is a microcomputer including a CPU, a memory and the like, and also includes a program to operate the CPU. The controller 23 controls the entirety of the display device 20.

The controller 23 obtains, via the receiver 22, the information sensed by the pen pressure sensing device 34. Based on the information, the controller 23 determines, for example, whether the user has written by use of the electronic pen 10 or not, and appropriately updates display information to be displayed on the display plane 21. The controller 23 also updates the display information to be displayed on the display plane 21 in accordance with the position on the display plane 21 of the tip of the electronic pen 10 calculated by the position information calculating circuitry 18 of the electronic pen 10. Owing to this, the letter input by the user by use of the electronic pen 10 is displayed on the display plane 21.

2. Operation

[2-1. Overview of Operations of the Handwriting Input System]

First, with reference to FIG. 3, an overview of an operation of the handwriting input system 100 will be described. The handwriting input system 100 operates as follows. The imaging section 12 shoots an image and transmits the image to the dot mark position detecting circuitry 15. The dot mark position detecting circuitry 15 detects the positions of the dot marks 50 in the shot image and transmits the detection results to the lattice position setting circuitry 16. The lattice position setting circuitry 16 selects a plurality of dot marks 50 which are to form a dot pattern. The lattice position setting circuitry 16 calculates the positions on the display plane 21 of lattice points 50a respectively corresponding to the selected dot marks 50 and transmits the results to the dot mark decoding circuitry 17. The dot mark decoding circuitry 17 generates relative position information and transmits the results to the position information calculating circuitry 18. The position information calculating circuitry 18 uses the relative position information to calculate the position information on the dot marks 50. In a final step, the position information calculating circuitry 18 specifies the position of the pen tip section 32 on the display plane 21.

The transmitter 19 transmits the information including the results of calculation performed by the position information calculating circuitry 18 to the display device 20. The controller 23 of the display device 20 receives, via the receiver 22, the information transmitted from the transmitter 19 of the electronic pen 10. The controller 23 updates the display information to be displayed on the display plane 21 in accordance with the information including the results of calculation performed by the position information calculating circuitry 18. Owing to this, the letter input by the user by use of the electronic pen 10 is displayed on the display plane 21. In this manner, the handwriting input system 100 can sense the positions at which the user has input information with high precision and reflect the input letter on the display plane 21.

Now, an operation of each of the dot mark position detecting circuitry 15, the lattice position setting circuitry 16, the dot mark decoding circuitry 17 and the position information calculating circuitry 18 of the electronic pen 10 will be described in detail.

[2-2. Operation of the Dot Mark Position Detecting Circuitry 15]

Figure 4:
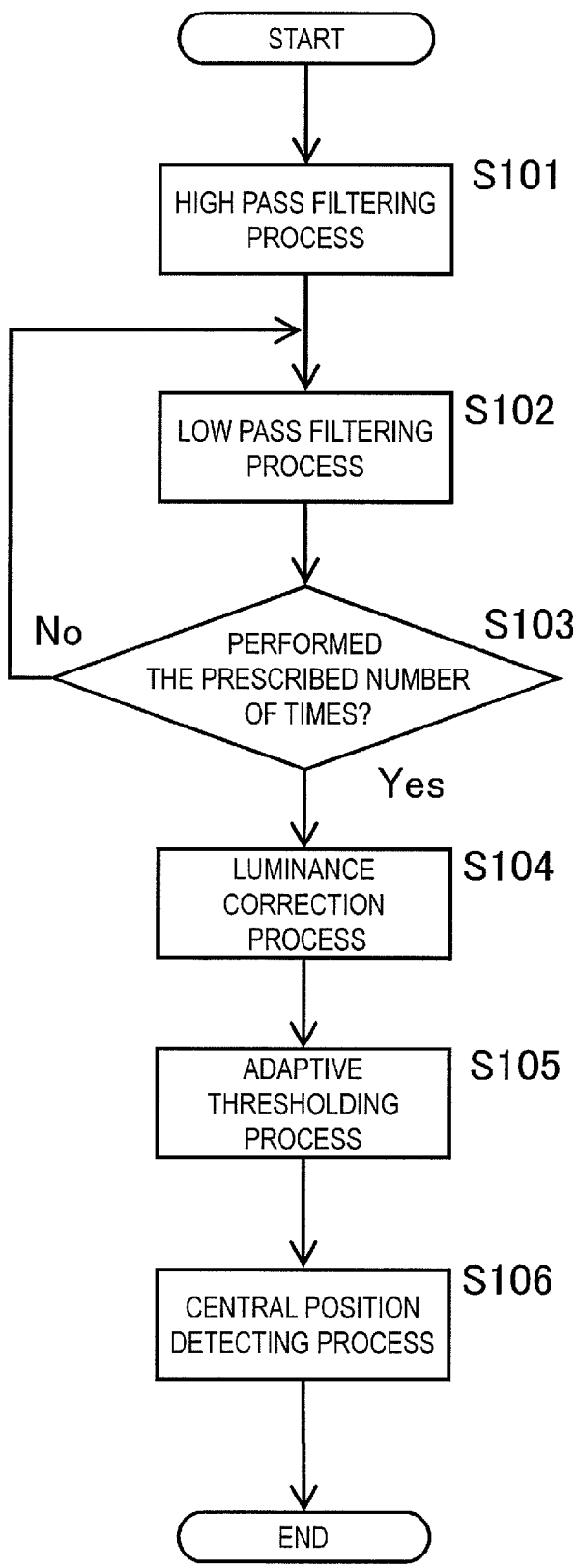
FIG. 4 is a flowchart showing an operation of dot mark position detecting circuitry 15.
Figure 5:
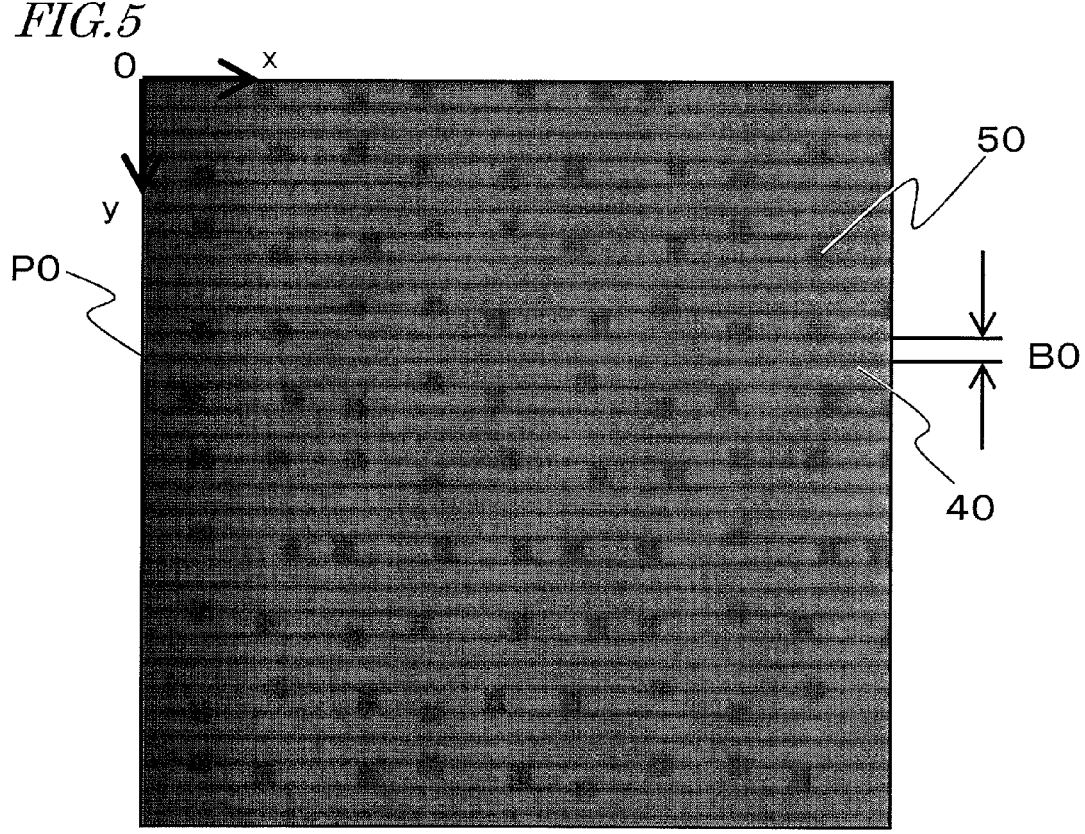
FIG. 5 shows an example of image shot by an image sensor 14 when the electronic pen 10 is held in a reference state.

First, with reference to FIG. 4 through FIG. 14, an operation of the dot mark position detecting circuitry 15 will be described. FIG. 4 is a flowchart showing the operation of the dot mark position detecting circuitry 15. FIG. 5 shows an example of image shot by the image sensor 14 of the imaging section 12. The image shown in FIG. 5 is shot when the electronic pen 10 is held in a reference state. The "reference state" refers to a state where, as shown in FIG. 2, the display plane 21 and the imaging area of the image sensor 14 are parallel to each other. Namely, in the reference state, the electronic pen 10 is perpendicular to a surface of the display plane 21. In an image P0 shown in FIG. 5, a plurality of dot marks 50 are existent as generally square black regions. In a horizontal direction of the image, a plurality of black lines 40 extend.

Now, the black lines 40 will be described. The display device 20, which is a liquid crystal display or the like, includes a black matrix for demarcating R, G and B display pixels. The black matrix includes black lines extending in a vertical direction and black lines extending in the horizontal direction. Usually, the black lines extending in the horizontal direction are thicker. The black matrix is formed of a material containing carbon black as a main component. Since carbon black has a very high infrared ray absorptivity, the black matrix absorbs infrared rays. Therefore, the black lines 40 extending in the horizontal direction are existent in the image P0 shown in FIG. 5. The black lines extending in the vertical direction have a size equal to or smaller than the pixel resolution of the image sensor 14 and therefore are not existent in the image P0 shown in FIG. 5.

Figure 6:
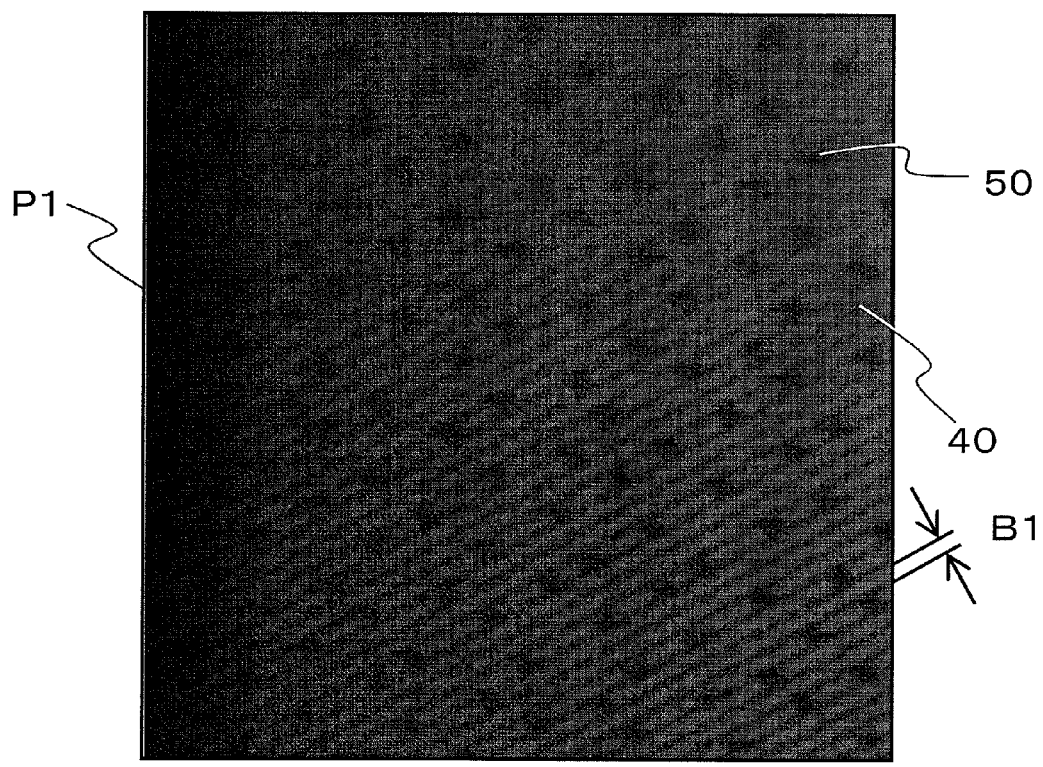
FIG. 6 shows an example of image shot by the image sensor 14 when the electronic pen 10 is inclined and/or rotated.

The image P0 is formed of, for example, 240×240 pixels. In the image P0, the dot marks 50 each have a size of about 6 pixels in the vertical and horizontal directions. The black lines 40 each have a thickness of 2 pixels. Namely, the size of each dot mark 50 in the vertical direction is about three times as large as the thickness of each black line. Inter-line interval B0 of the black lines 40 is about 8 pixels. The image P0 shown in FIG. 5 is obtained when the electronic pen 10 is held in the reference state. The dot marks 50 and the black lines 40 appear largest in an image shot in the reference state. However, when being actually operated by the user, the electronic pen 10 is not always held in the reference state. The electronic pen 10 is inclined at any angle with respect to the display plane 21 and is rotated at any angle about an axial direction of the pen tip section 32 of the electronic pen 10. FIG. 6 shows an example P1 of image shot in a state where the electronic pen 10 is thus inclined and/or rotated. In the image P1, the black lines 40 are inclined with respect to the horizontal direction. Thus, it is seen that the electronic pen 10 is rotated about the axial direction. Inter-line interval B1 of the black lines 40 is obviously narrower than the inter-line interval B0, and the dot marks 50 are smaller. This is caused by the electronic pen 10 being inclined with respect to the display plane 21.

Hereinafter, with reference to the image P1 shown in FIG. 6, the operation of the dot mark position detecting circuitry 15 will be described along with the flowchart shown in FIG. 4.

[2-2-1. High Pass Filtering Process (S101)]

In the image P1 shown in FIG. 6, left-right luminance non-uniformity is conspicuous. The luminance non-uniformity is caused by a change in the luminance in a low frequency range. In order to alleviate the influence of the luminance non-uniformity, the dot mark position detecting circuitry 15 performs a high pass filtering process.

It is assumed that in the image P1, a pixel which is x'th in a rightward direction and is y'th in a downward direction from the top left corner has a luminance P1(x,y). A filtering process, which is also referred to as smoothing or blurring, is a process of finding a weighted sum of pixels surrounding the pixel P1(x,y) of interest of the input image P1 to provide an output image P1a. For example, attention is paid to 2×N1+1 pixels in the horizontal direction and 2×N1+1 pixels in the vertical direction, and the output image P1a is calculated for the pixel P1 of interest by use of expression 1.

$$P1a(x, y) = \sum_{\substack{-N1 \leq i \leq N1 \\ -N1 \leq j \leq N1}} F(x+i, y+j) \cdot P1(x+i, y+j) \quad \text{[Expression 1]}$$

In the expression, F(x,y) is a weighting coefficient and is also called a "kernel". The size of the kernel is called "kernel size". When a moving average filter, which makes all the coefficients the same, is used, good smoothing results are obtained with a short calculation time. For example, when the kernel size of the moving average filter is 3×3, each of coefficients of the filter is ⅑. A weighted average filter in which the weight in the vicinity of the pixel P1(x,y) of interest is made larger (e.g., Gaussian filter) may be used.

Figure 7:
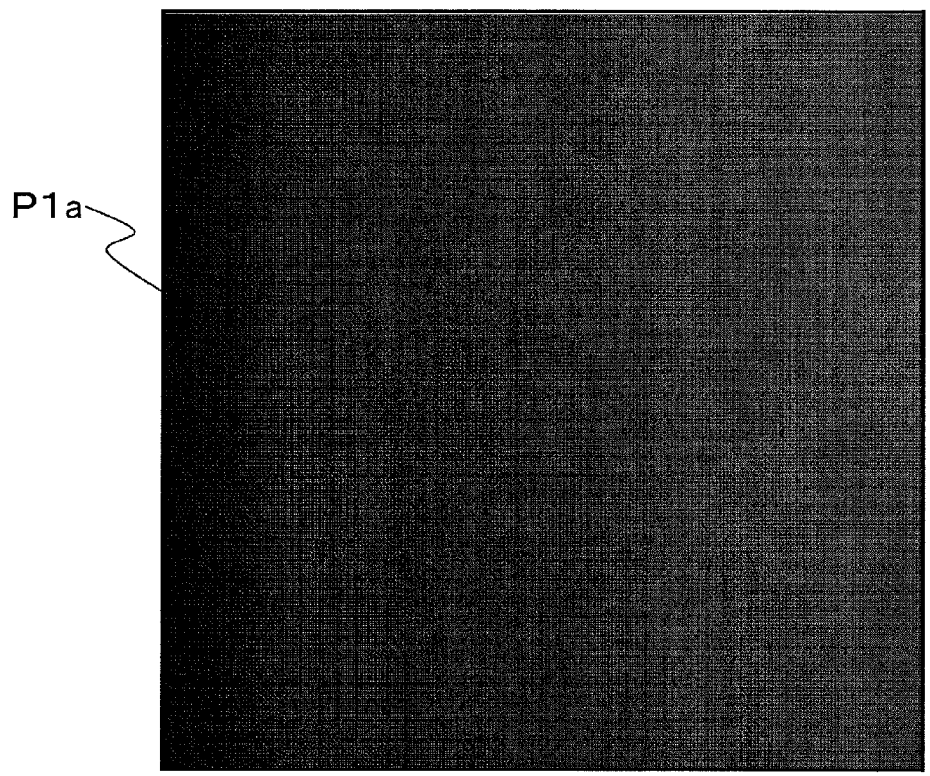
FIG. 7 shows an example of image after a smoothing process in step S101.

Results of the smoothing process performed by use of the moving average filter are shown in FIG. 7 as the image P1a. The high pass filtering process is a process of finding a difference between the original image P1 and the smoothed image P1a. The high pass filtering process is represented by expression 2.

$$P2(x, y) = P1(x, y) - P1a(x, y) \quad \text{[Expression 2]}$$

$$= P1(x, y) - \sum_{\substack{-N1 \leq i \leq N1 \\ -N1 \leq j \leq N1}} F(x+i, y+j) \cdot P1(x+i, y+j)$$

Figure 8:
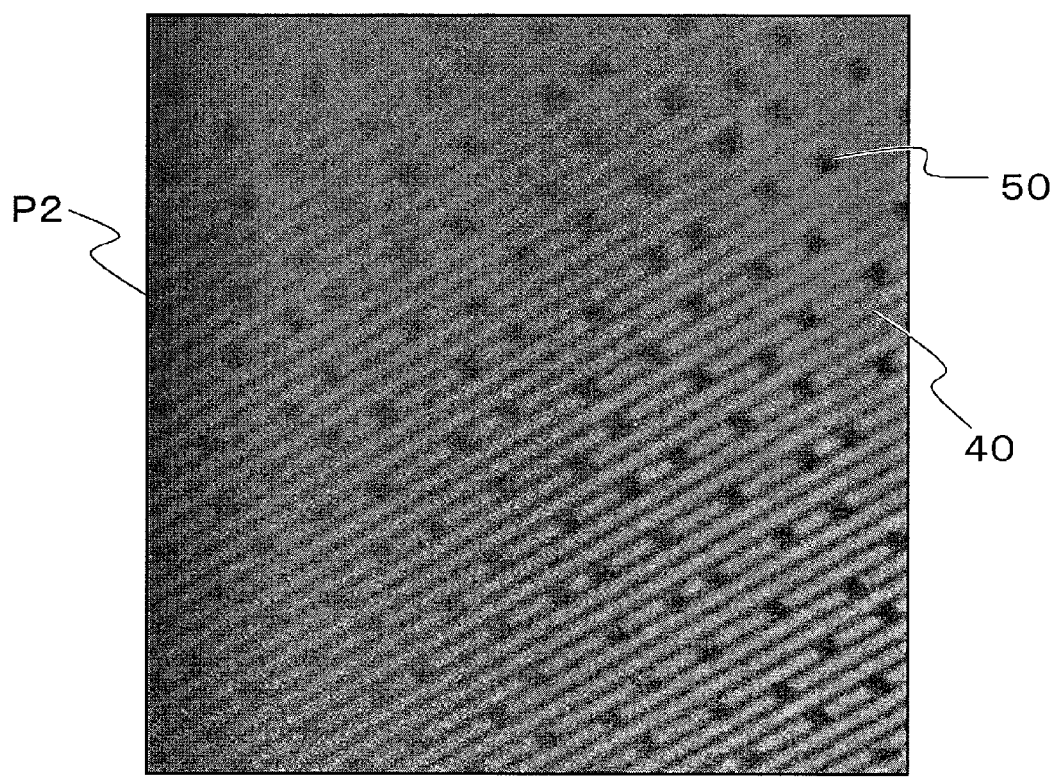
FIG. 8 shows an example of image after a high pass filtering process in step S101.

Results of the high pass filtering process are shown in FIG. 8 as an image P2. In this embodiment, the kernel size is set so as to substantially fulfill 2×N1+1=B0×COS(γ)×3. In the expression, γ is the maximum tilt angle permitted by the electronic pen 10. In a state where the electronic pen 10 is most inclined with respect to the display plane 21, the inter-line interval B1 of the black lines 40 is B1=B0×cos(γ). Thus, the kernel size is selected to be about three times as large as B1. For example, when γ is permitted to be γ=45° at the maximum, approximately. N1=7 is an appropriate value because B0 is 8 pixels. By selecting the kernel size in this manner, the influence of the luminance non-uniformity can be alleviated with no influence of the black lines 40.

[2-2-2. Low Pass Filtering Process (S102)]

Next, the dot mark position detecting circuitry 15 performs a low pass filtering process for the purpose of removing the black lines 40 from the image P2 obtained as a result of the high pass filtering process. The low pass filtering process is the smoothing process itself described above and is represented by expression 3.

$$P3(x, y) = \sum_{\substack{-N2 \leq i \leq N2 \\ -N2 \leq j \leq N2}} F(x+i, y+j) \cdot P2(x+i, y+j) \quad \text{[Expression 3]}$$

In expression 3, like in expression 2, F(x,y) is the weighting coefficient. When a moving average filter, which makes all the coefficients the same, is used, good smoothing results are obtained with a short calculation time. In this embodiment, the kernel size is set so as to substantially fulfill 2×N2+1=B0×cos(γ). In a state where the electronic pen 10 is most inclined with respect to the display plane 21, the inter-line interval B1 of the black lines 40 is B1=B0×cos(γ). Thus, the kernel size is selected to be about the same as B1. For example, when γ is permitted to be γ=45' at the maximum, approximately N2=2 is an appropriate value because B0 is 8 pixels. By selecting the kernel size in this manner, the black lines 40 can be substantially removed while the dot marks 50 remain.

[2-2-3. Repetition of the Low Pass Filtering Process (S103)]

Figure 9:
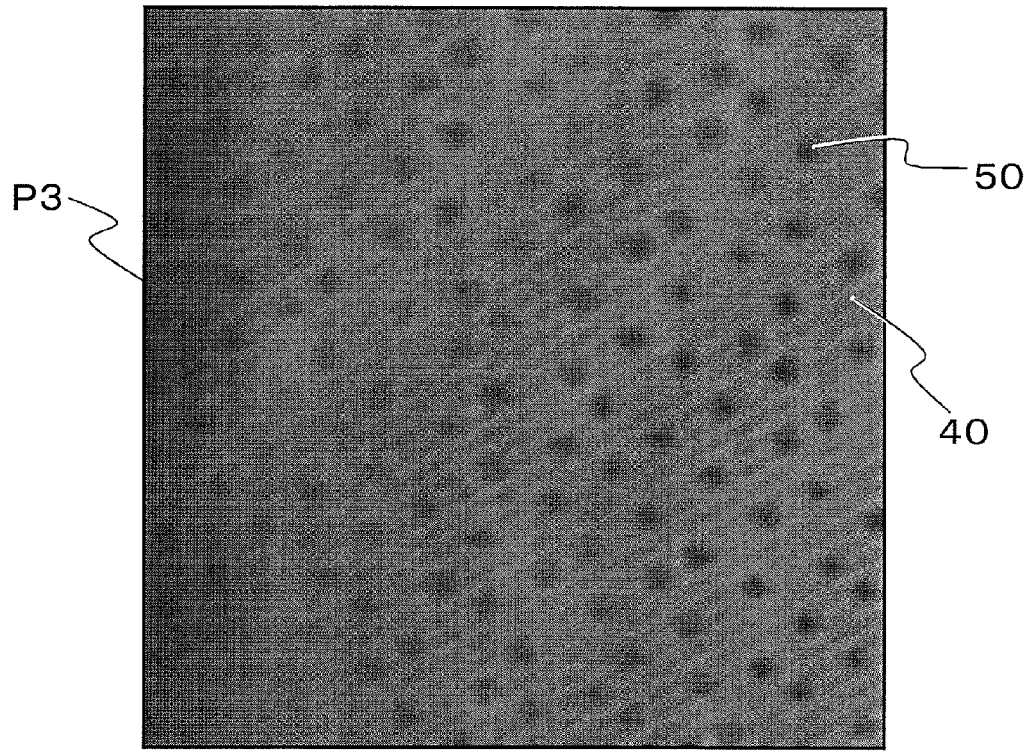
FIG. 9 shows an example of image after a low pass filtering process in step S102 is performed for the first time.

Results of the low pass filtering process represented by expression 3 that is performed on the image P2 shown in FIG. 8 are shown in FIG. 9 as an image P3. In FIG. 9, the black lines 40 are paler but still remain.

Next, in step S103, the dot mark position detecting circuitry 15 executes the low pass filtering process represented by expression 3 in repetition a prescribed number of times. After executing the low pass filtering process the prescribed number of times, the dot mark position detecting circuitry 15 executes the processing in step S104.

Figure 10:
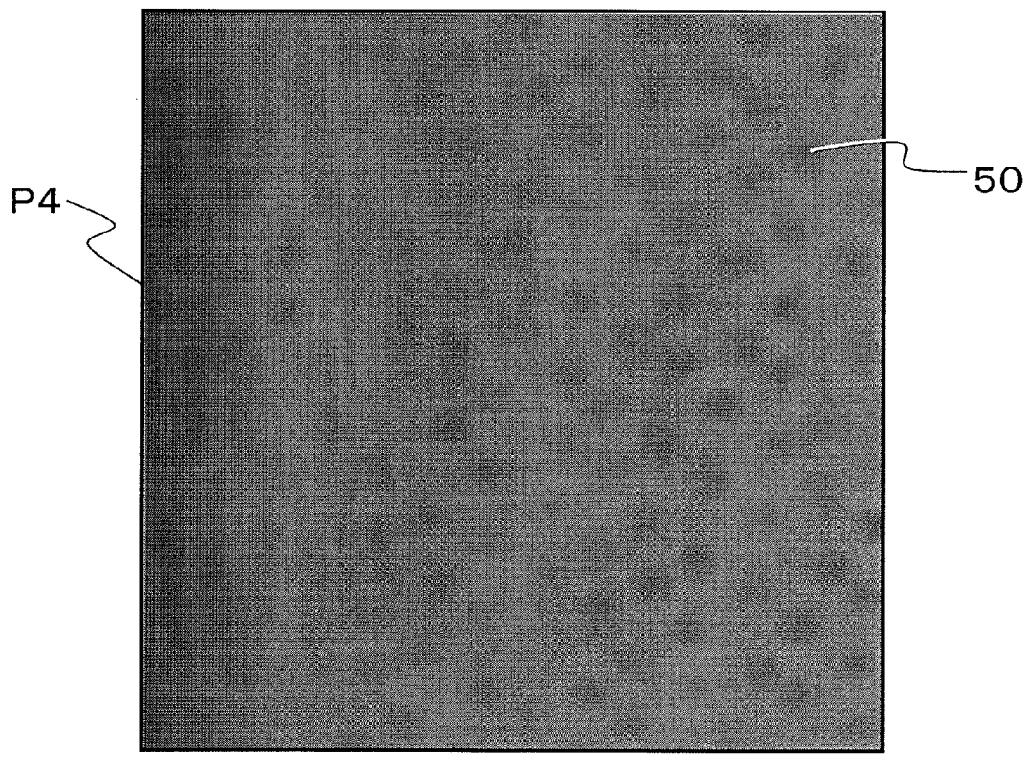
FIG. 10 shows an example of image after the low pass filtering process in step S102 is performed for the third time.

Results of the low pass filtering process represented by expression 3 that is executed five times in total are shown in FIG. 10 as an image P4. The black lines 40 are substantially removed. The dot marks 50 are paler but still remain.

Figure 11:
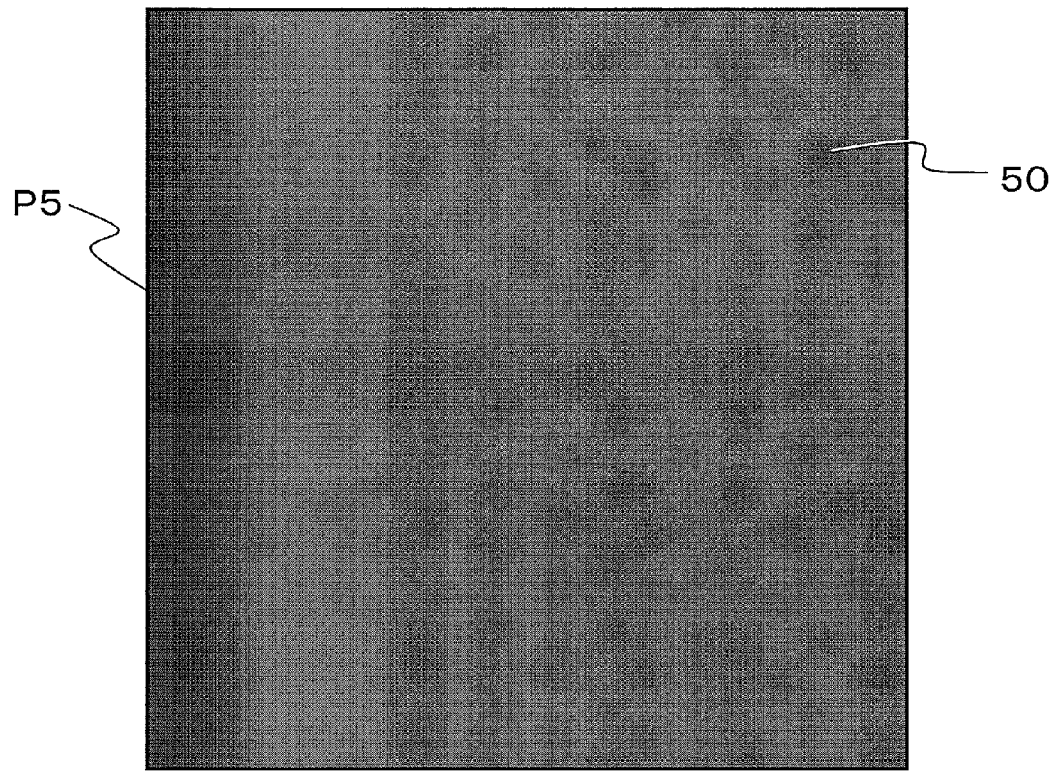
FIG. 11 shows an example of image after the low pass filtering process in step S102 is performed for the seventh time.

Results of the low pass filtering process represented by expression 3 that is executed seven times in total are shown in FIG. 11 as an image P5. In the image P5 also, the dot marks 50 still remain. The prescribed number of times used for the determination in step S103 may be set to be larger than the smallest number of times needed to remove the black lines 40 (e.g., five times) (e.g., the prescribed number of times may be set to seven times). Owing to this, the black lines 40 can be removed with certainty.

Since the kernel size in expression 3 is set so as to fulfill 2×N2+1=B0×cos(γ), the dot marks 50 remain. A reason for this is that each dot mark 50 has a size of about 6 pixels in the vertical and horizontal directions and thus is about three times as large as the thickness of each black line 40, which is about 2 dots. In other words, the spatial frequency of each dot mark 50 is about three times as low as the spatial frequency of each black line.

[2-2-4. Luminance Correction Process (S104)]

In the image P5 shown in FIG. 11 obtained as a result of executing the low pass filtering process represented by expression 3 seven times, the dot marks 50 are still seen. However, the contrast of the entire image is very low. Therefore, the dot mark position detecting circuitry 15 corrects the luminance of each pixel. Specifically, the dot mark position detecting circuitry 15 performs a luminance correction process on luminance value $P5(x,y)$ of each pixel in the image P5 in accordance with expression 4. Expression 4 is used to adjust the dynamic range.

$$P6(x, y) = (P5(x, y) - P5\text{ min}) \cdot \frac{255}{(P5\text{ max} - P5\text{ min})} \quad \text{[Expression 4]}$$

Figure 12:
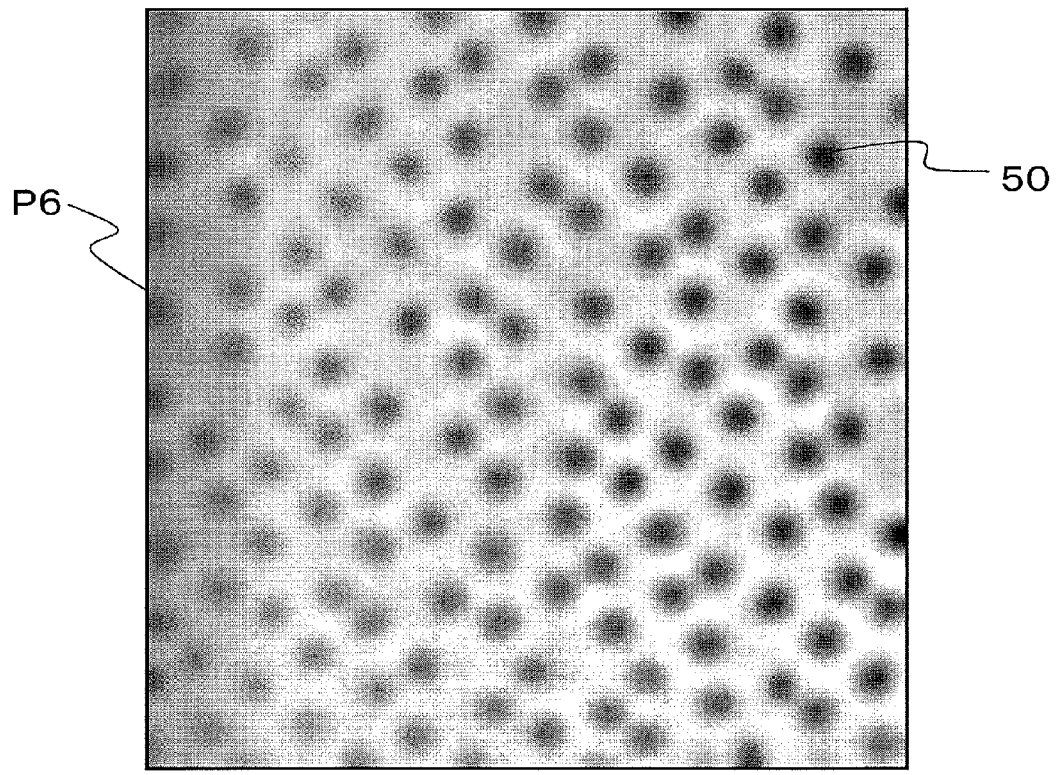
FIG. 12 shows an example of image after a luminance correction process in step S104.

In the expression, P5max and P5min are respectively a maximum luminance value and a minimum luminance value among the luminance values of all the pixels in the pixel P5. The luminance of each pixel is represented by 8 bits. Namely, the luminance is represented by a numerical figure from 0 (black) to 255 (white). Results of the luminance correction process represented by expression 4 are shown in FIG. 12 as an image P6. Even when the difference between the maximum luminance value and the minimum luminance value is small, the dynamic range is enlarged to the full luminance range, and the shape of the dot marks 50 can be more clearly recognized than in FIG. 11.

[2-2-5. Adaptive Thresholding Process (S105)]

Next, the dot mark position detecting circuitry 15 performs an adaptive thresholding process as a pre-process for detecting the positions of the dot marks 50. The "adaptive thresholding process" refers to thresholding which is performed while the threshold value is varied in accordance with the location. More specifically, the adaptive thresholding process is performed by use of expression 5.

$$T(x, y) = \left[ \sum_{\substack{-N3 \leq i \leq N3 \\ -N3 \leq j \leq N3}} F(x+i, y+j) \cdot P6(x+i, y+j) \right] - Tc \quad \text{[Expression 5]}$$

In expression 5, T(x,y) represents the threshold value. The thresholding process is performed by comparing the threshold value and the luminance value of $P6(x,y)$. In the expression, Tc is a predefined fixed value. F(x,y) is the weighting coefficient. For example, as a filter for F(x,y), a moving average filter, which makes all the coefficients the same, may be used.

In this embodiment, the kernel size is set so as to substantially fulfill $2 \times N3 + 1 = B0 \times \cos(\gamma)$. The kernel size of F(x,y) is set to an average value of the kernel size $2 \times N1 + 1$ in the high pass filtering process in S101 and the kernel size $2 \times N2 + 1$ in the low pass filtering process in S102. Since the low pass filtering process in S102 is performed after the high pass filtering process in S101, substantially the same effect as that of a band pass filtering process can be provided. By selecting a kernel size corresponding to the center frequency of the band pass filter, the adaptive thresholding process can be performed most effectively.

In a state where the electronic pen 10 is most inclined, the inter-line interval B1 of the black lines 40 is $B1 = B0 \times \cos(\gamma)$. Thus, the kernel size is selected to be about twice as large as B1. For example, when $\gamma$ is permitted to be $\gamma = 45°$ at the maximum, approximately N3=5 is an appropriate value because B0 is 8 pixels.

Figure 13:
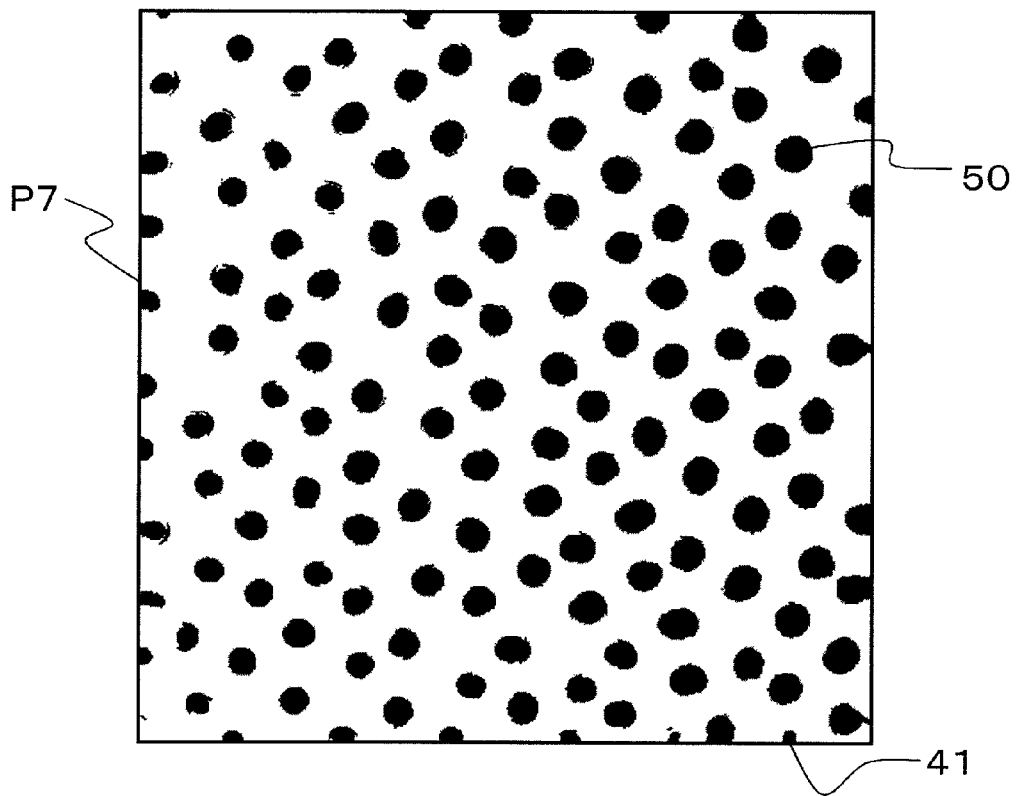
FIG. 13 shows an example of image after an adaptive thresholding process in step S105.

Results of the adaptive thresholding process performed on the image P6 shown in FIG. 12 by use of the threshold value represented by expression 5 are shown in FIG. 13 as an image P7. Even in the image P6 (FIG. 12) obtained as a result of the luminance correction process, the contrast of the dot marks 50 is different between on the left side and on the right side of the image. The contrast is higher on the right side than on the left side. However, in the post-adaptive thresholding process image P7 shown in FIG. 13, it is confirmed that the dot marks 50 can be correctly detected as black circular regions having substantially the same size on the left side and on the right side of the image.

[2-2-6. Central Position Detection Process (S106)]

Next, the dot mark position detecting circuitry 15 finds center position V1 of each dot mark 50 in the post-thresholding process image P7.

First, the dot mark position detecting circuitry 15 performs a labeling process on the post-adaptive thresholding process image P7. Next, the dot mark position detecting circuitry 15 finds a centroid of the black regions having the same label and sets the centroid as the center position V1 of each dot mark 50. Such a series of processes are repeated for black regions having each of various labels, and as a result, the center position V1 is formed for all the dot marks 50, which are the black regions included in the image.

When finding the center position V1 of each dot mark 50, the dot mark position detecting circuitry 15 also determines an area size of each black region. When the area size of the black region is equal to or smaller than a prescribed value, the dot mark position detecting circuitry 15 determines the black region as noise. For example, when the area size of the black region is equal to or smaller than 8 pixels, the dot mark position detecting circuitry 15 determines the black region as noise. In this case, the dot mark position detecting circuitry 15 does not regard the black region as the dot mark 50, and thus does not find the centroid.

Figure 14:
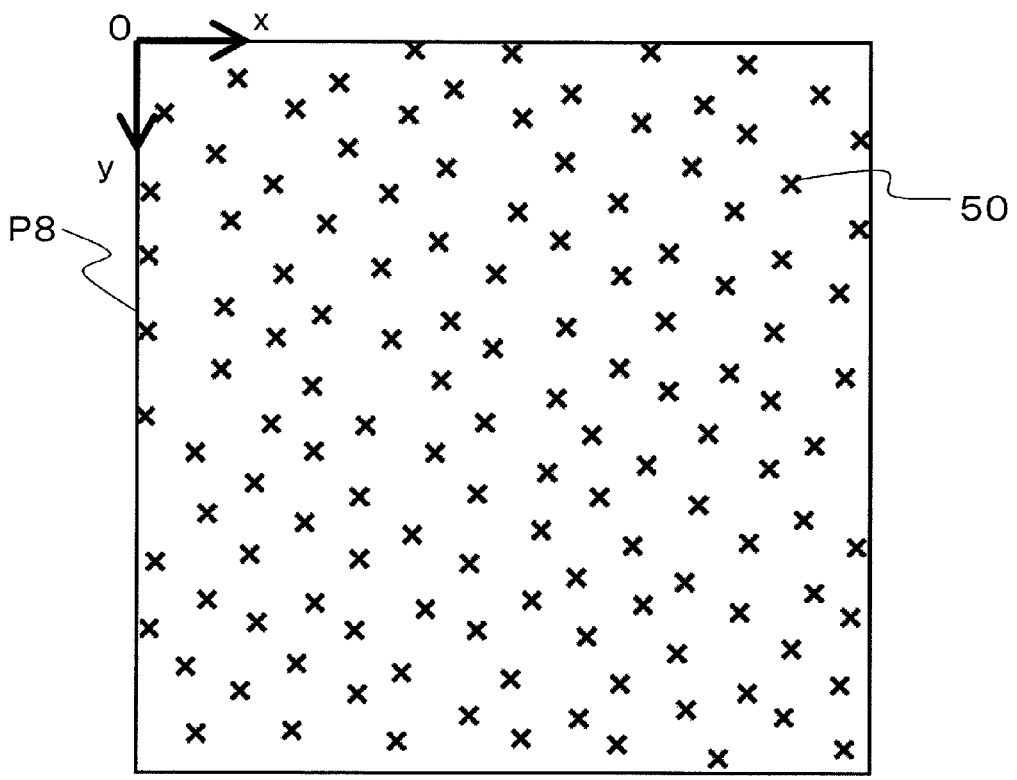
FIG. 14 shows results of center position detection in step S106.

FIG. 14 shows an image P8 in which the center positions V1 of the dot marks 50 obtained by the above-described process are displayed by the "×" symbols on the image. Among the black regions shown in FIG. 13, black regions 41 having a smaller area size are determined as noise. Therefore, in FIG. 14, the "×" symbol is not displayed at a position corresponding to the centroid of each of the black region 41.

According to another technique, the dot mark position detecting circuitry 15 may detect the white-black borders of the post-thresholding process image P7 as closed profiles. The dot mark position detecting circuitry 15 may find the center position of a circle or a rectangle surrounding each closed profile and set the center position as the center position V1 of each of the dot marks 50. Alternatively, the dot mark position detecting circuitry 15 may perform a line integral along pixel positions of the closed profiles, and set the results as the center position V1. In the case where the size of the circle or rectangle surrounding each closed profile (diameter or the length of the side), or the number of pixels forming the profile is equal to or smaller than a prescribed value, the region may be determined as noise.

In this embodiment, a pixel coordinate system (x,y) having the top left corner of the image P8 as the origin is defined. When the total number of the detected dot marks 50 is M, the coordinates (x,y) in the pixel coordinate system of the k'th dot mark 50 ($0 \leq K < M$) is represented as (V1[K]x, V1[K]y).

[2-2-7. Effects of the Dot Mark Position Detecting Circuitry 15]

As described above, in this embodiment, the dot mark position detecting circuitry 15 determines appropriate kernel sizes N1, N2 and N3 based on the inter-line interval B0 of the black lines 40. Owing to this, in the high pass filtering process in S101, the influence of the luminance non-uniformity can be alleviated with no influence of the black lines 40.

The low pass filtering process in S102 is repeated in S103 the predefined number of times. Owing to this, only the black lines 40 can be removed while the dot marks 50 remain.

In the adaptive thresholding process in S105, a kernel size corresponding to the center frequency of the band pass filter is set. Therefore, the image including the black regions of the dot marks 50 can be accurately transformed to a binary image. As a result, even when the electronic pen 10 is inclined and/or rotated, the position V1 in the pixel coordinate system (x,y) of each dot mark 50 can be accurately detected with no influence of the black lines 40.

[2-3. Operation of the Lattice Position Setting Circuitry 16]

Now, with reference to FIG. 15 through FIG. 25, an operation of the lattice position setting circuitry 16 will be described.

Figure 15:
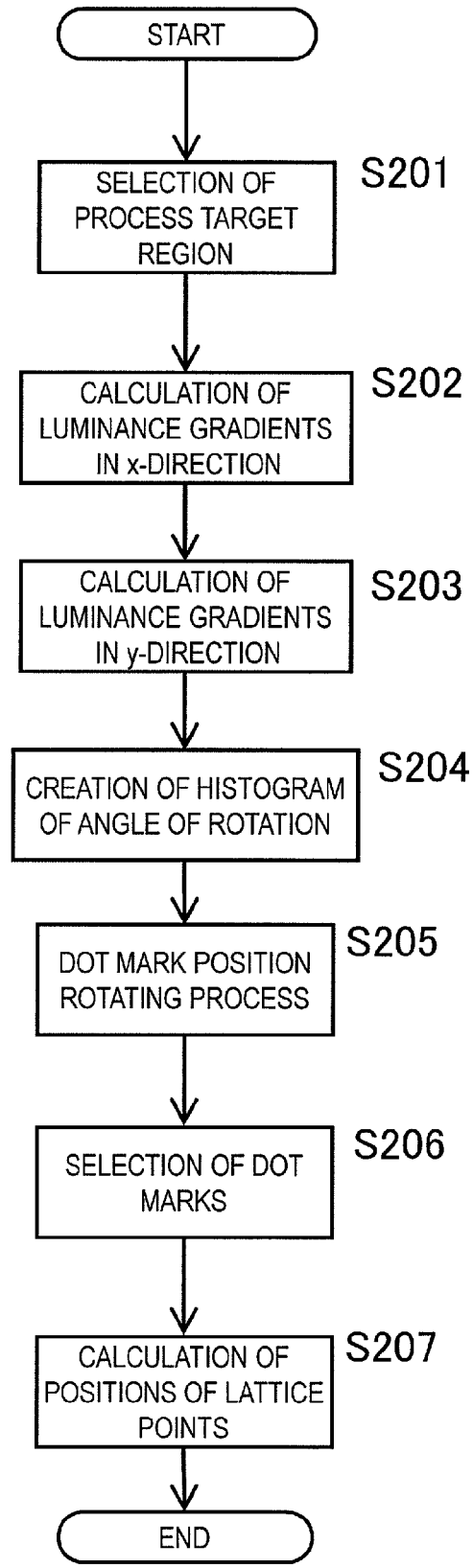
FIG. 15 is a flowchart showing an operation of lattice position setting circuitry 16.

FIG. 15 is a flowchart showing the operation of the lattice position setting circuitry 16.

Hereinafter, each process of the operation of the lattice position setting circuitry 16 will be described in order along with the flowchart. As represented by the "×" symbols in the image P8 shown in FIG. 14, the positions V1 of the dot marks 50 are already detected. From the plurality of dot marks 50 provided in a total number of M, the lattice position setting circuitry 16 selects dot marks 50 to be used to form a dot pattern, for example, dot marks 50 located in a 6×6 lattice. The directions of the 6×6 lattice match the horizontal and vertical directions of the display plane 21. Namely, the directions of the 6×6 lattice match the directions of the world coordinate system (X,Y) shown in FIG. 1. In this embodiment, the coordinate system (X,Y) having the top left corner of the display plane 21 as the origin as shown in FIG. 1 will be defined. This coordinate system is called the world coordinate system (X,Y).

When the electronic pen 10 is inclined in any direction and rotated, the directions of the 6×6 lattice do not match the directions of the pixel coordinate system (x,y) shown in FIG. 14. Therefore, the lattice position setting circuitry 16 cannot determine the directions of the world coordinate system (X,Y) of the display plane 21 from the image P8 shown in FIG. 14, which shows the detection results of the positions V1 of the dot marks 50.

In this embodiment, in order to determine the X-axis direction of the world coordinate system of the display plane 21, the lattice position setting circuitry 16 detects the rotation angle of the black lines 40 by processes in S201 through S204 described below.

[2-3-1. Selection of a Processing Region (S201)]

Figure 16:
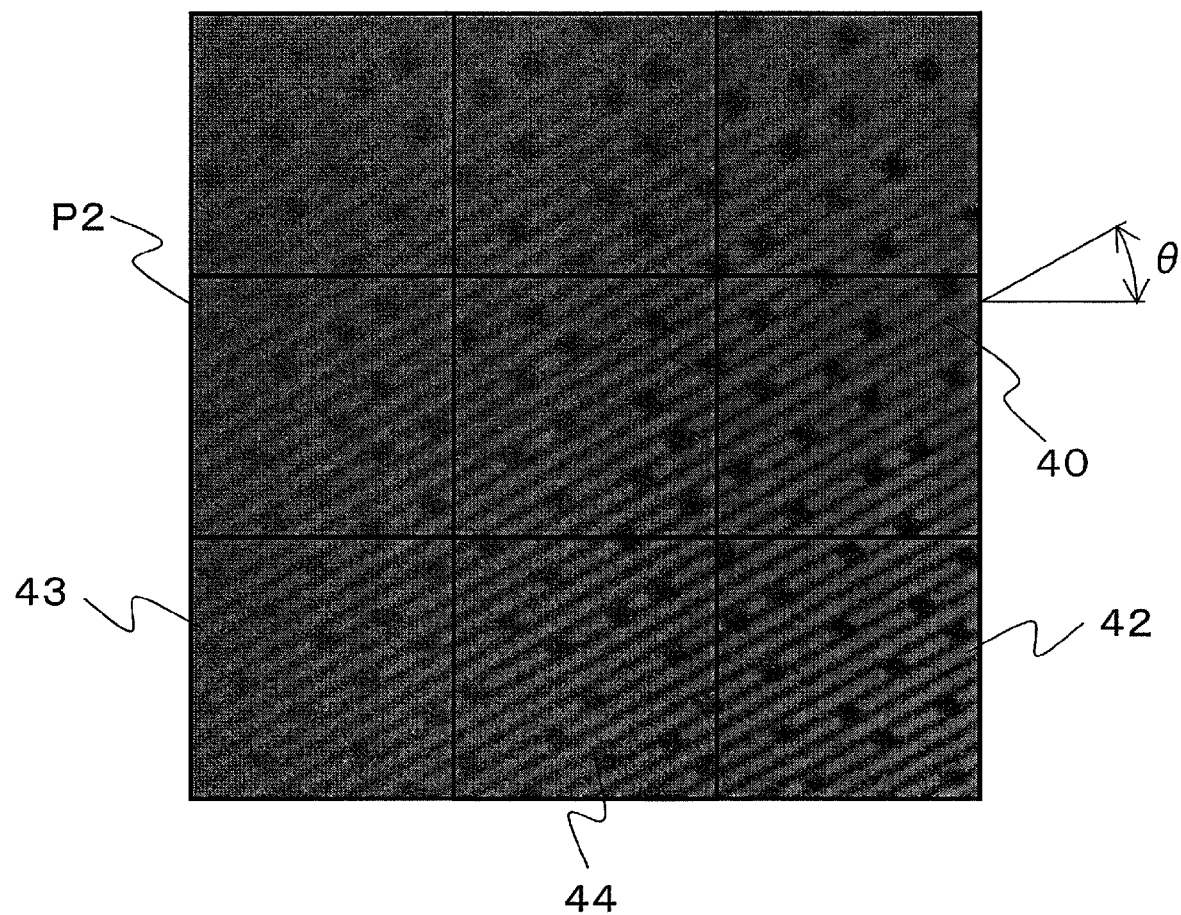
FIG. 16 shows a processing region in step S201.

FIG. 16 shows the post-high pass filtering process image P2 which is divided into 9 regions (3×3). In this embodiment, it is assumed that the black lines 40 are rotated by θ≈−29° with respect to the horizontal direction of the image, where the clockwise direction is a positive direction.

For detecting the rotation angle of the black lines 40, the lattice position setting circuitry 16 uses the image P2 after the high pass filtering process in S101 because the contrast of the black lines 40 is highest in the image P2. The lattice position setting circuitry 16 does not need to perform the processes on all the pixels of the image P2, and therefore first selects a processing region.

The lattice position setting circuitry 16 can find a luminance histogram of all the pixels included in each of the 9 (3×3) divided regions, calculate a variance thereof and determine whether the contrast is good or not. In the image P2 shown in FIG. 16, the contrast of a bottom right region 42 is highest. The region 42 is brightest.

The brightness of each region is easily determined by calculating an average luminance value of all the pixels in each of the 9 (3×3) regions. Thus, the lattice position setting circuitry 16 can select the processing region based on the average luminance values of the regions.

In this embodiment, LED elements are provided as the illumination device 11 inside the housing of the electronic pen 10, more specifically, on the left and on the right of the tip of the electronic pen 10. The left and right LED elements emit light alternately.

The image P2 shown in FIG. 16 is obtained in a state where only the right LED element, which is closest to the region 42, emits light. Therefore, the region 42 is brightest and has the highest contrast.

By contrast, when only the left LED element emits light, a bottom left region 43 is brightest. In this case, the lattice position setting circuitry 16 may select the region 43 as the processing region. In this manner, the lattice position setting circuitry 16 can select the processing region in advance in accordance with light emission conditions of the illumination device 11 (e.g., which of the LED elements is to emit light).

Alternatively, when the left and right LED elements emit light at the same time, the lattice position setting circuitry 16 may select a bottom center region 44 as the processing region.

After the processing region is selected, the lattice position setting circuitry 16 performs a smoothing process by use of a filter having a kernel size of about 3×3. This is performed for the purpose of removing noise (salt and pepper noise) generated by the high pass filtering process in S101. Therefore, for example, a medium filter is usable. The lattice position setting circuitry 16 may perform the smoothing process only on the selected processing region.

[2-3-2. Calculation of x-Direction Luminance Gradients (S202)]

Next, the lattice position setting circuitry 16 calculates a luminance gradient in the x direction of the pixel coordinate system on each pixel in the processing region (region 42) by use of a Sobel filter. By the Sobel filter, a primary differential coefficient in the space is found. The x-direction luminance gradient P2x(x,y) is calculated by use of expression 6.

$$P2x(x, y) = \sum_{\substack{-2 \leq i \leq 2 \\ -2 \leq j \leq 2}} F(x+i, y+j) \cdot P2(x+i, y+j) \quad \text{[Expression 6]}$$

$$F: \begin{pmatrix} -1 & -2 & 0 & 2 & 1 \\ -4 & -8 & 0 & 8 & 4 \\ -6 & -12 & 0 & 12 & 6 \\ -4 & -8 & 0 & 8 & 4 \\ -1 & -2 & 0 & 2 & 1 \end{pmatrix}$$

In expression 6, the weighting coefficient F(x,y) is represented in a matrix form. In expression 7, each of components of the weighting coefficient F(x,y) is represented as being developed.

$$F: \begin{pmatrix} F\begin{pmatrix}x-2,\\y-2\end{pmatrix} & F\begin{pmatrix}x-1,\\y-2\end{pmatrix} & F(x,y-2) & F\begin{pmatrix}x+1,\\y-2\end{pmatrix} & F(x,+2,y-2) \\ F\begin{pmatrix}x-2,\\y-1\end{pmatrix} & F\begin{pmatrix}x-1,\\y-1\end{pmatrix} & F(x,y-1) & F\begin{pmatrix}x+1,\\y-1\end{pmatrix} & F\begin{pmatrix}x+2,\\y-1\end{pmatrix} \\ F(x-2,y) & F(x-1,y) & F(x,y) & F(x+1,y) & F(x+2,y) \\ F\begin{pmatrix}x-2,\\y+1\end{pmatrix} & F\begin{pmatrix}x-1,\\y+1\end{pmatrix} & F(x,y+1) & F\begin{pmatrix}x+1,\\y+1\end{pmatrix} & F\begin{pmatrix}x+2,\\y+1\end{pmatrix} \\ F\begin{pmatrix}x-2,\\y+2\end{pmatrix} & F\begin{pmatrix}x-1,\\y+2\end{pmatrix} & F(x,y+2) & F\begin{pmatrix}x+1,\\y+2\end{pmatrix} & F\begin{pmatrix}x+2,\\y+2\end{pmatrix} \end{pmatrix}$$

[Expression 7]

[2-3-3. Calculation of y-Direction Luminance Gradients (S203)]

Next, the lattice position setting circuitry 16 calculates a luminance gradient in the y direction of the pixel coordinate system on each pixel in the processing region (region 42) by use of a Sobel filter. The y-direction luminance gradient P2$y$(x,y) is calculated by use of expression 8.

$$P2y(x, y) = \sum_{\substack{-2 \leq i \leq 2 \\ -2 \leq j \leq 2}} F(x+i, y+j) \cdot P2(x+i, y+j)$$ [Expression 8]

$$F: \begin{pmatrix} -1 & -4 & -6 & -4 & -1 \\ -2 & -8 & -12 & -8 & -2 \\ 0 & 0 & 0 & 0 & 0 \\ 2 & 8 & 12 & 8 & 2 \\ 1 & 4 & 6 & 4 & 1 \end{pmatrix}$$

[2-3-4. Creation of a Histogram of the Rotation Angle (S204)]

Next, the lattice position setting circuitry 16 calculates the rotation angle S2$(x,y)$ in the image P2$(x,y)$ by use of expression 9 from the luminance gradients in the two directions, namely, the x and y directions defined by expressions 6 and 8.

$$S2(x, y) = \tan^{-1}\left(\frac{P2y(x, y)}{P2x(x, y)}\right)$$ [Expression 9]

After calculating the rotation angle S2$(x,y)$ each pixel in the processing region (region 42), the lattice position setting circuitry 16 generates a histogram of the rotation angle. As the bin width of the histogram, 1°, for example, is sufficient.

Based on expression 9, when only the ratio of the absolute values of the x-direction and y-direction luminance gradients are considered, the calculation results of the rotation angle S2$(x,y)$ may be always the same regardless of the magnitude of the absolute values of the x-direction and y-direction luminance gradients.

In this embodiment, in order to avoid this, the lattice position setting circuitry 16 generates a weighted histogram. More specifically, the lattice position setting circuitry 16 accumulates (votes) the Euclid distance (value of S3) of the x-direction and y-direction luminance gradients shown in expression 10 in a bin including the rotation angle S2$(x,y)$.

$$S3 = \sqrt{P2x(x,y)^2 + P2y(x,y)^2}$$ [Expression 10]

According to the above-described weighted histogram, for a pixel for which the calculation results of the rotation angle S2$(x,y)$ has a low reliability, the voting value to the corresponding bin can be decreased; whereas for a pixel for which the calculation results of the rotation angle S2$(x,y)$ has a high reliability, the voting value to the corresponding bin can be increased. As a result, the calculation results of the rotation angle S2$(x,y)$ at a pixel for which the calculation results have a high reliability are reflected on the histogram.

Figure 17:
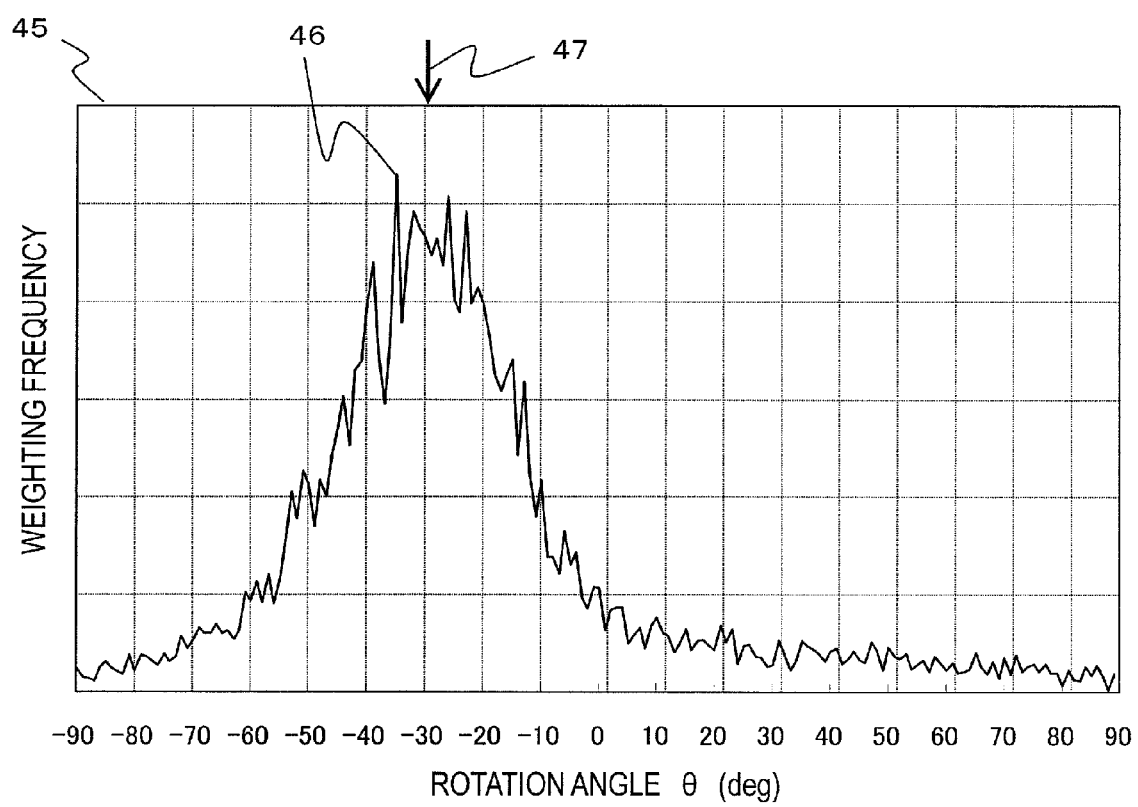
FIG. 17 is a graph showing a histogram of rotation angle in step S204.

FIG. 17 shows a weighted histogram 45 obtained by the above-described process. In FIG. 17, the horizontal axis represents the rotation angle θ set in the range of −90° to +90°, and is divided by a 1°-unit bin. The vertical axis represents the weighting frequency (accumulation results). The bin position at which the weighting frequency is maximum in the weighted histogram 45 is position 46. The rotation angle at the position 46 is θ=−35°. At center value 47 of the weighted histogram 45, the rotation angle is θ=−29°. In this case, as is clear from the shape of the weighted histogram 45, the rotation angle θ at the center value 47 of the weighted histogram 45 may be adopted as the rotation angle of the black lines 40.

In this embodiment, the calculations in expressions 6, 8, 9 and 10 are performed only on each of the pixels in the region 42. The present disclosure is not limited to this. The lattice position setting circuitry 16 may perform the above-described calculations on all the pixels included in the image P2. Alternatively, the lattice position setting circuitry 16 may perform the above-described calculations on every other pixel in the vertical and horizontal directions among the pixels included in the region 42.

[2-3-5. Dot Mark Position Rotation Process (S205)]

Next, the lattice position setting circuitry 16 finds position V2, which is rotated by −θ from the center position V1 of each of the dot marks 50 provided in a total number of M in the image P8 shown in FIG. 14. The lattice position setting circuitry 16 rotates the image P8 in such a direction that cancels the rotation angle θ of the black lines 40. Specifically, the lattice position setting circuitry 16 performs the calculation of expression 11.

$$\begin{pmatrix} V2[K]x \\ V2[K]y \end{pmatrix} = R \begin{pmatrix} V1[K]x \\ V1[K]y \\ 1 \end{pmatrix}$$ [Expression 11]

Figure 18:
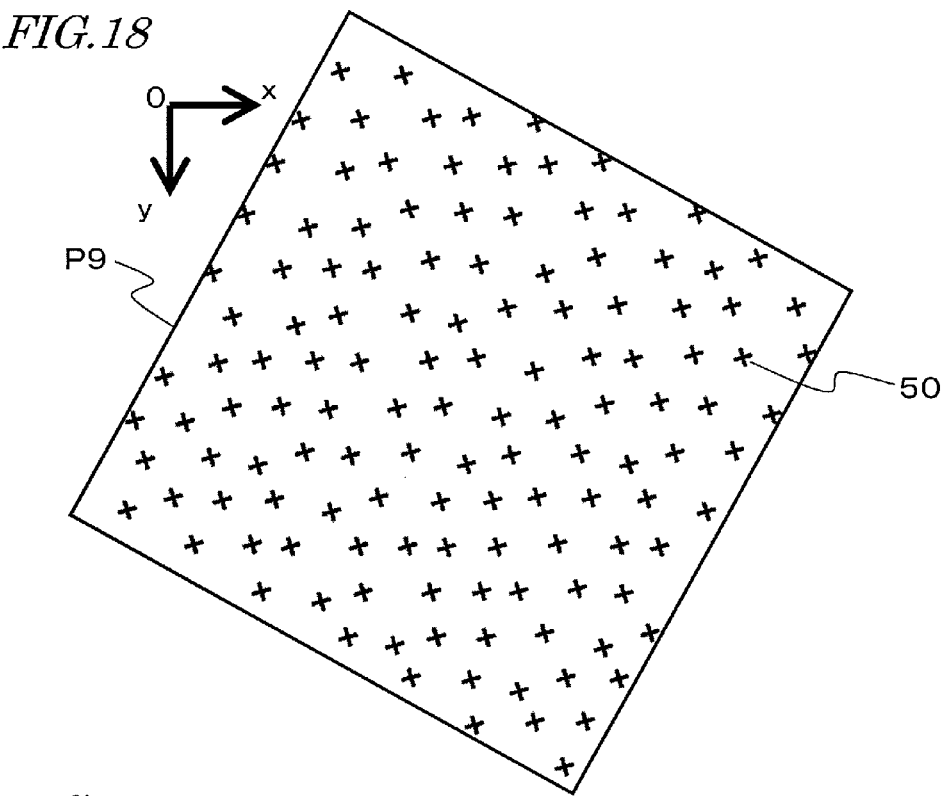
FIG. 18 shows results of a dot mark position rotation process in step S205.

In the expression, R is a 2×3 affine transformation matrix defined by the rotation angle of −θ and the position of the rotation center. FIG. 18 shows an image P9 in which the center positions V2 of the post-rotation dot marks 50 are represented by the "×" symbols.

[2-3-6. Selection of Dot Marks (S206)]

In FIG. 18, the x-axis direction of the pixel coordinate system (horizontal direction of the figure) matches the direction of the black lines 40. Namely, the x-axis direction of the pixel coordinate system matches the X-axis direction of the world coordinate system of the display plane 21.

The lattice position setting circuitry 16 selects the dot marks 50 located in a 6×6 lattice to form a dot pattern by the following procedure. Herein, a 6×6 two-dimensional matrix in which I denotes 0, 1, 2, 3, 4, 5 in the X-axis direction of the world coordinate system and J denotes 0, 1, 2, 3, 4, 5 in the Y-axis direction of the world coordinate system will be discussed. The lattice position setting circuitry 16 selects the dot marks 50 which respectively correspond to the elements of the two-dimensional matrix.

Figure 19:
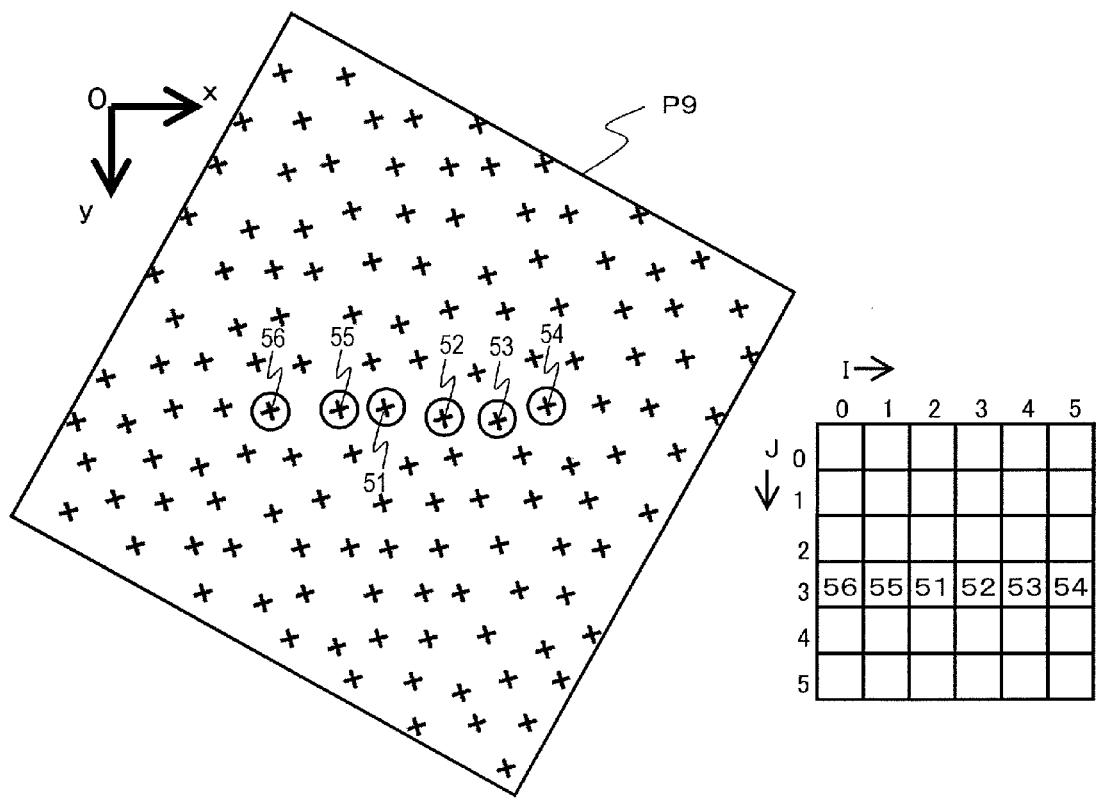
FIG. 19 shows a dot mark selection method in step S206.

First, referring to FIG. 19, the lattice position setting circuitry 16 selects a dot mark 51 closest to the center of the image P1 or P8 from the M number of dot marks in the image P9 shown in FIG. 18. In the following figures, in order to clearly show the selected dot marks 50, the selected dot marks 50 are represented by the "×" symbols enclosed by large circles.

The position of the dot mark 51 is slightly shifted in a leftward and downward direction from the center position of the image P1 or P8. Therefore, the position of the dot mark 51 is assigned the numbers of I=2 and J=3, and will be represented as (V2[I,J]x, V2[I,J]y) or represented with the I and J numbers as (V2[2, 3]x, V2[2, 3]y). In the case where the position of the dot mark 51 is shifted in a rightward and upward direction from the center position of the image P1 or P8, the position of the dot mark 51 may be assigned the numbers of I=3 and J=2.

In this manner, a group of 6×6 dot marks 50 closest to the central part of the image P1 or P8 can be selected as continuously described below.

Next, the lattice position setting circuitry 16 selects a dot mark 52 immediately right to the dot mark 51. More specifically, the lattice position setting circuitry 16 selects the dot mark 52 by the following method.

The lattice position setting circuitry 16 narrows the target of selection to only the dot marks 50 existent to the right of the dot mark 51, and then to the dot marks 50 which may be connected to the dot mark 51 by a line segment where the angle made by the line segment and the x-axis direction has an absolute value equal to or smaller than a prescribed angle (e.g., 45°). Among the obtained dot marks 50, the lattice position setting circuitry 16 selects a dot mark 50 which may be connected to the dot mark 51 by the shortest line segment as the dot mark 52.

The lattice position setting circuitry 16 assigns the dot mark 52 the number of I=3. Similarly, the lattice position setting circuitry 16 selects a dot mark 53 and a dot mark 54 to the right of the dot mark 51, and assigns the dot mark 53 and the dot mark 54 the numbers of I=4 and I=5 respectively.

The lattice position setting circuitry 16 selects a dot mark 55 to the left of the dot mark 51 and a dot mark 56 to the left of the dot mark 55, and assigns the dot mark 55 and the dot mark 55 the numbers of I=2 and I=1 respectively. These dot marks are not shifted in the vertical direction and thus are all assigned the number of J=3.

Figure 20:
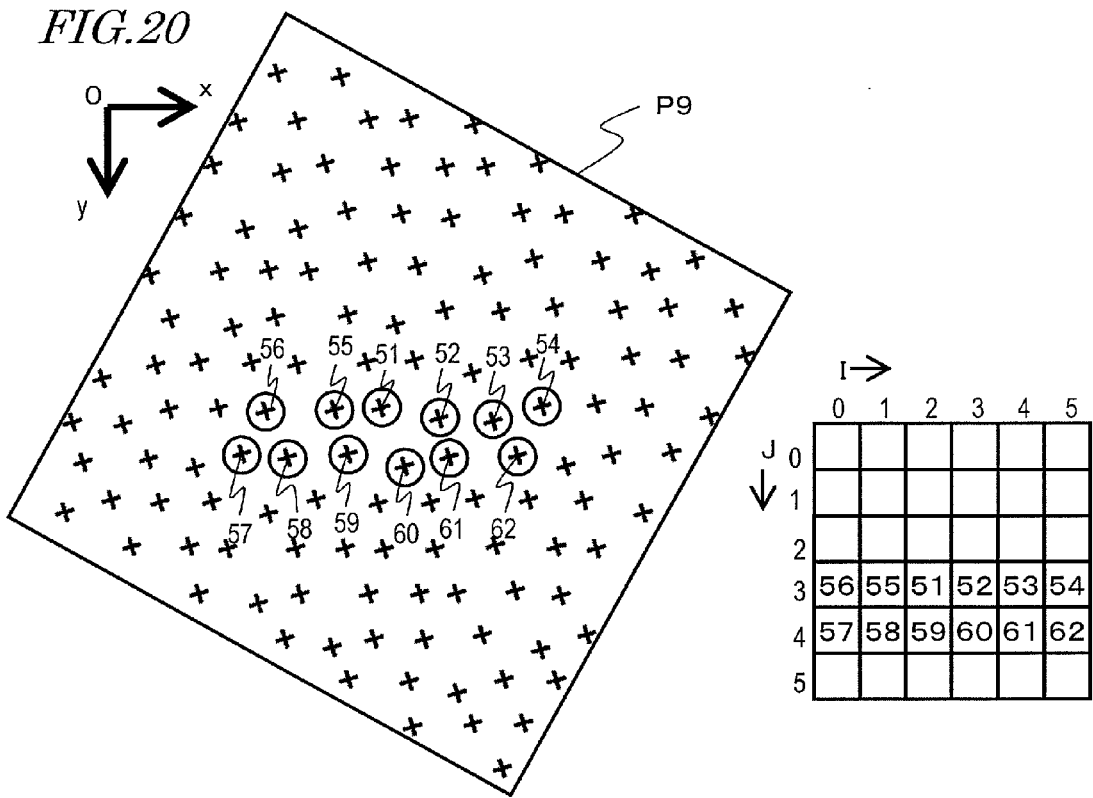
FIG. 20 shows the dot mark selection method in step S206.

Next, as shown in FIG. 20, the lattice position setting circuitry 16 selects a dot mark 57 below the dot mark 56. The dot mark 56 is selected as follows. The lattice position setting circuitry 16 narrows the target of selection to only the dot marks 50 existent below the dot mark 56, and then to the dot marks 50 which may be connected to the dot mark 56 by a line segment where the angle made by the line segment and the y-axis direction has an absolute value equal to or smaller than a prescribed angle (e.g., 45°). Among the obtained dot marks 50, the lattice position setting circuitry 16 selects a dot mark 50 which may be connected to the dot mark 56 by the shortest line segment as the dot mark 57.

The dot mark 57 is assigned the numbers of I=0 and J=4. The lattice position setting circuitry 16 sequentially selects a dot mark 58, a dot mark 59, a dot mark 60, a dot mark 61 and a dot mark 62 to the right of the dot mark 57. These dot marks are assigned the numbers of I=1, 2, 3, 4 and 5 respectively and the number of J=1.

As described above, the x-axis direction of the pixel coordinate system in FIG. 20 (horizontal direction of the figures) matches the direction of the black lines 40, and therefore matches the X-axis direction of the world coordinate system of the display plane 21. However, the Y-axis direction of the world coordinate system of the display plane 21 does not match the y-axis direction of the pixel coordinate system.

In actuality, two dot marks, namely, the dot mark 57 and the dot mark 58 are existent as candidates of the dot mark 50 below the dot mark 56. Therefore, the lattice position setting circuitry 16 checks a left-right shift between the dot marks adjacent to each other in the J direction (J=3 and J=4). In this embodiment, the lattice position setting circuitry 16 calculates three values Sx1, Sx2 and Sx3 by use of expression 12.

$$Sx1 = |V2[0,4]x - V2[1,3]x| + |V2[1,4]x - V2[2,3]x| + |V2[2,4]x - V2[3,3]x| + |V2[3,4] - V2[4,3]x|$$

$$Sx2 = |V2[1,4]x - V2[1,3]x| + |V2[2,4]x - V2[2,3]x| + |V2[3,4]x - V2[3,3]x| + |V2[4,4] - V2[4,3]x|$$

$$Sx3 = |V2[2,4]x - V2[1,3]x| + |V2[3,4]x - V2[2,3]x| + |V2[4,4]x - V2[3,3]x| + |V2[5,4] - V2[4,3]x| \quad \text{[Expression 12]}$$

The three values Sx1, Sx2 and Sx3 are found from a total sum of differences between the x-axis direction coordinates of the dot marks adjacent to each other in the J direction (J=3 and J=4) in the pixel coordinate system.

Regarding four points having the same number of I, a total sum of the differences between the x-axis direction coordinates is Sx2. Sx1 and Sx3 are each a total sum of the differences between the x-axis direction coordinates of the dot marks, shifted leftward or rightward in terms of the combination of the I numbers, in the pixel coordinate system.

The lattice position setting circuitry 16 compares the three values Sx1, Sx2 and Sx3. When Sx2 is the minimum value, the lattice position setting circuitry 16 goes to the next selection work (selection work shown in FIG. 22) because there is no left-right shift.

Figure 21:
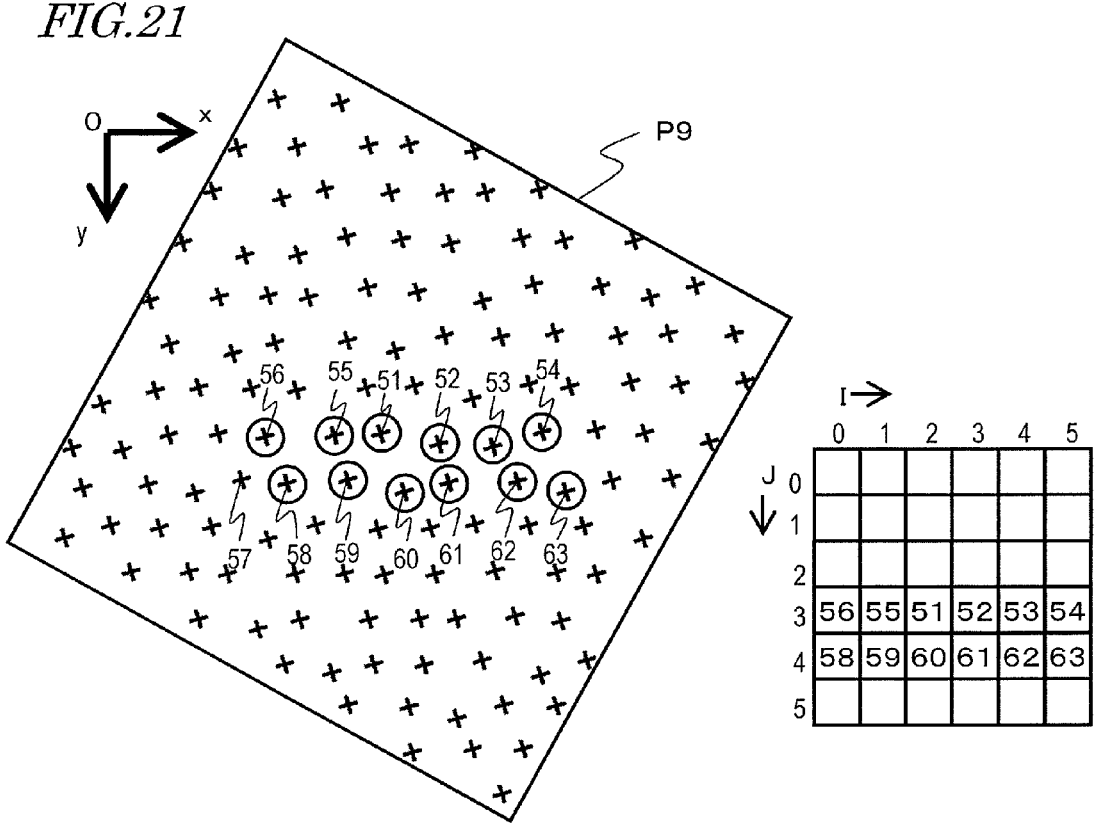
FIG. 21 shows the dot mark selection method in step S206.

By contrast, when Sx3 is the minimum value, the six dot marks 57, 58, 59, 60, 61 and 62 of J=4 are shifted leftward. In this case, as shown in FIG. 21, the lattice position setting circuitry 16 excludes the dot mark 57 from the selected dot marks, and newly selects a dot mark 63 to the right of the dot mark 62. The lattice position setting circuitry 16 newly assigns the six dot marks 58, 59, 60, 61, 62 and 63 the numbers of I=0, 1, 2, 3, 4 and 5 respectively, and then goes to the next selection work.

When Sx1 is the minimum value, the six dot marks 57, 58, 59, 60, 61 and 62 of J=4 are shifted rightward. In this case, the lattice position setting circuitry 16 may exclude the dot mark 62 from the selected dot marks, and newly select a dot mark (not shown) to the left of the dot mark 57, oppositely to the case where the Sx3 is the minimum value.

Figure 22:
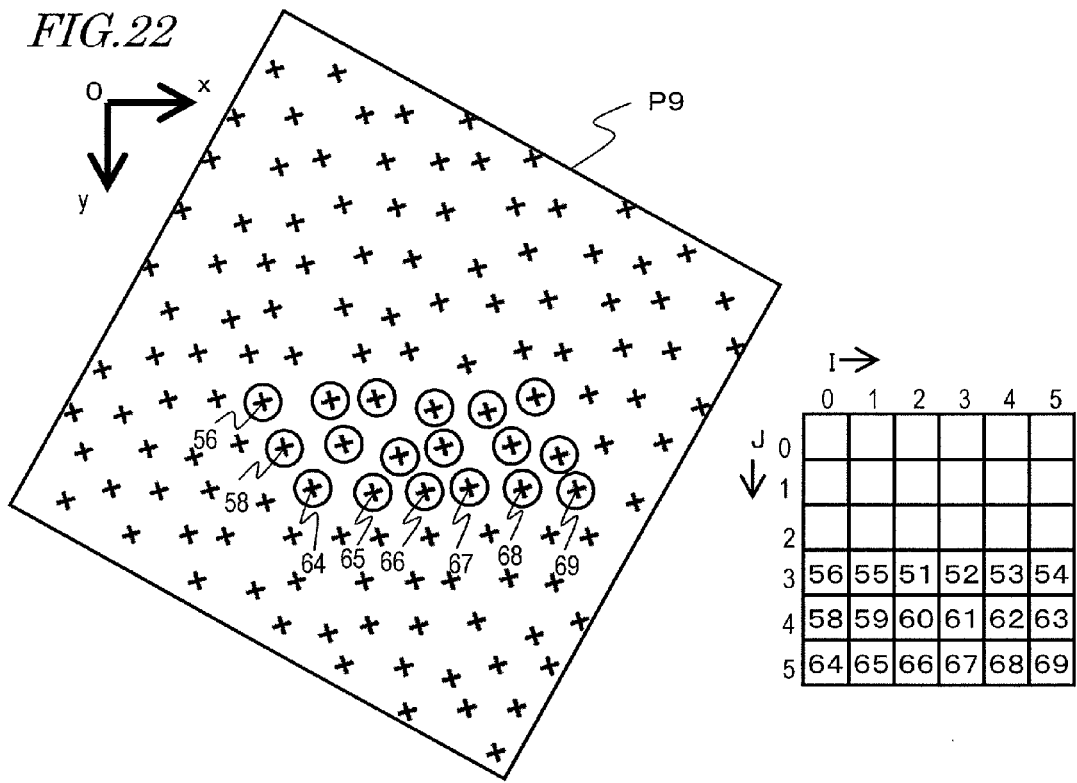
FIG. 22 shows the dot mark selection method in step S206.

Next, as shown in FIG. 22, the lattice position setting circuitry 16 selects a dot mark 64 below the dot mark 58 and assigns the dot mark 64 the numbers of I=0 and J=5. Then, the lattice position setting circuitry 16 sequentially selects dot marks 65, 66, 67, 68 and 69 to the right of the dot mark 64. These dot marks are assigned the numbers of I=1, 2, 3, 4 and 5 respectively and the number of J=5. The lattice position setting circuitry 16 calculates the three values Sx1, Sx2 and Sx3 in expression 12 regarding the dot marks having the numbers of J=4 and J=5 to check a left-right shift. When determining that the dot marks are shifted leftward or rightward based on the calculation results, the lattice position setting circuitry 16 re-selects six dot marks having the number of J=5.

Figure 23:
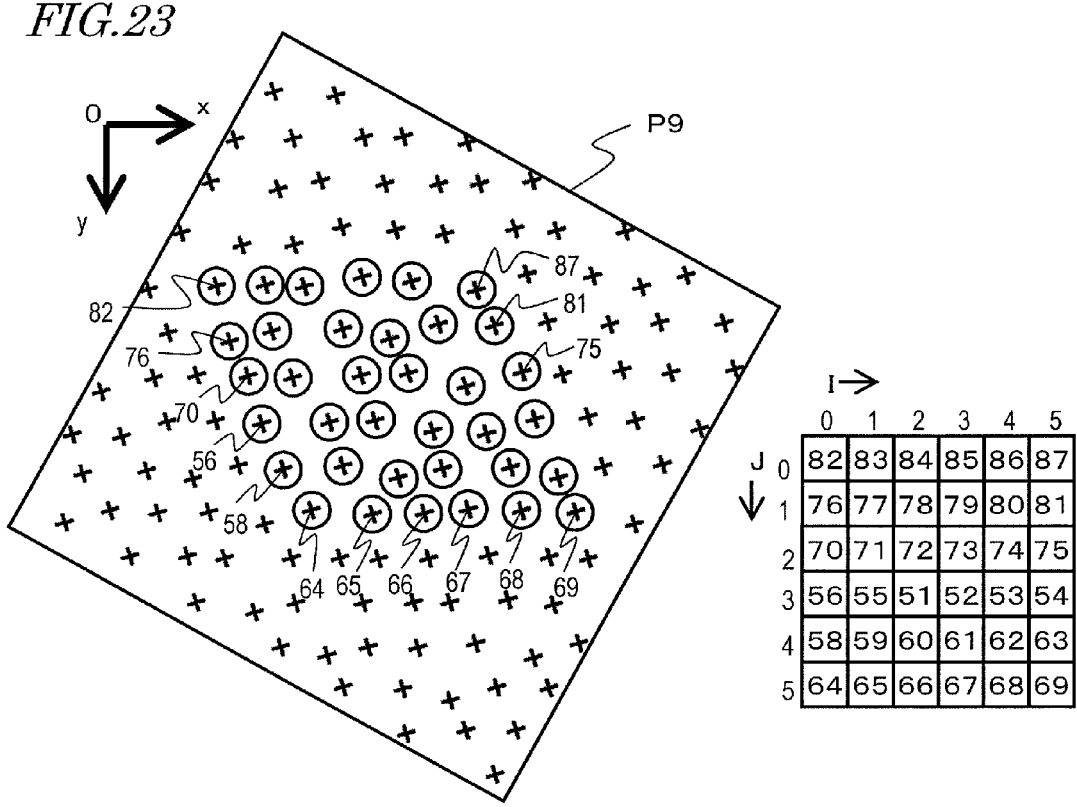
FIG. 23 shows the dot mark selection method in step S206.

Next, as shown in FIG. 23, the lattice position setting circuitry 16 selects a dot mark 70 above the dot mark 56 and assigns the dot mark 70 the numbers of I=0 and J=2. Then, the lattice position setting circuitry 16 sequentially selects dot marks 71, 72, 73, 74 and 75 to the right of the dot mark 70. These dot marks are assigned the numbers of I=1, 2, 3, 4 and 5 respectively and the number of J=2. The lattice position setting circuitry 16 checks a left-right shift also between the dot marks having the numbers of J=3 and J=2. When necessary, the lattice position setting circuitry 16 re-selects six dot marks having the number of J=2.

Next, the lattice position setting circuitry 16 selects a dot mark 76 above the dot mark 70 and assigns the dot mark 76 the numbers of I=0 and J=1. Then, the lattice position setting circuitry 16 sequentially selects dot marks 77, 78, 79, 80 and 81 to the right of the dot mark 76. These dot marks are assigned the numbers of I=1, 2, 3, 4 and 5 respectively and the number of J=1. The lattice position setting circuitry 16 checks a left-right shift also between the dot marks having the numbers of J=2 and J=1. When necessary, the lattice position setting circuitry 16 re-selects six dot marks having the number of J=1.

Next, the lattice position setting circuitry 16 selects a dot mark 82 above the dot mark 76 and assigns the dot mark 82 the numbers of I=0 and J=0. Then, the lattice position setting circuitry 16 sequentially selects dot marks 83, 84, 85, 86 and 87 to the right of the dot mark 82. These dot marks are assigned the numbers of I=1, 2, 3, 4 and 5 respectively and the number of J=0. The lattice position setting circuitry 16 checks a left-right shift also between the dot marks having the numbers of J=1 and J=0. When necessary, the lattice position setting circuitry 16 re-selects six dot marks having the number of J=0.

In the manner described above, the lattice position setting circuitry 16 selects the dot marks 51, 52, 53, . . . 87 which are located in a 6×6 lattice to form a dot pattern. The positions of these dot marks are selected by use of the center positions V2 of the post-rotation dot marks 50 shown in the image P9.

Figure 24:
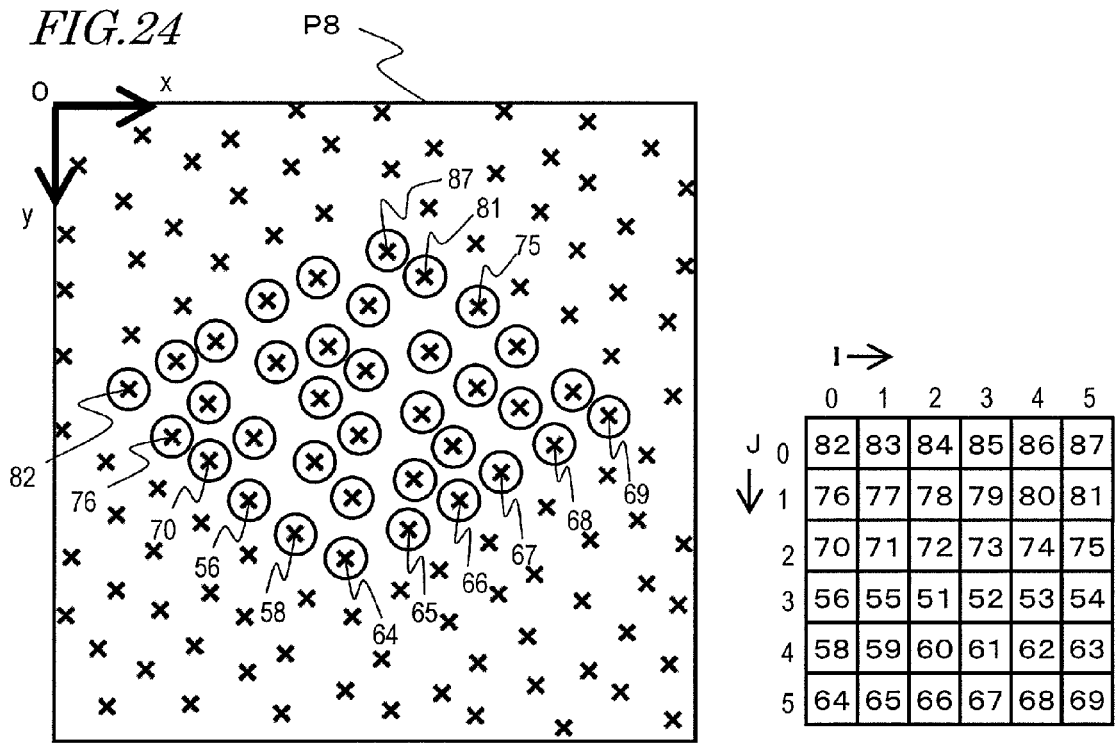
FIG. 24 shows the dot mark selection method in step S206.

The positional relationship between the pre-rotation dot marks 50 and the post-rotation dot marks 50 is defined by expression 11. Therefore, the center positions V2 of the post-rotation dot marks 50 can be transformed to the center positions V1 of the pre-rotation dot marks 50. Thus, regarding the coordinate V1 of the pre-rotation dot marks 50 also, coordinate values corresponding to the 6×6 matrix can be selected. As a result, the relationship shown in FIG. 24 is obtained. For example, the position V1 in the pre-rotation image P8 of the dot mark 51 assigned the numbers of I=2 and J=3 is represented as (V1[I,J]x, V1[I,J]y) or represented with the I and J numbers as (V1[2, 3]x, V1[2, 3]y).

[2-3-7. Calculation of the Positions of the Lattice Points (S207)]

Next, the lattice position setting circuitry 16 calculates the positions of the lattice points 50a. In the world coordinate system (X,Y) of the display plane 21, an intersection of the first reference line 44 and the second reference line 45 (or raster) corresponding to the individual dot marks 50 is referred to as the "lattice point 50a". Regarding the lattice point 50a also, a 6×6 matrix corresponding to the dot pattern will be discussed. Coordinate values W1 thereof can be easily calculated.

Figure 25:
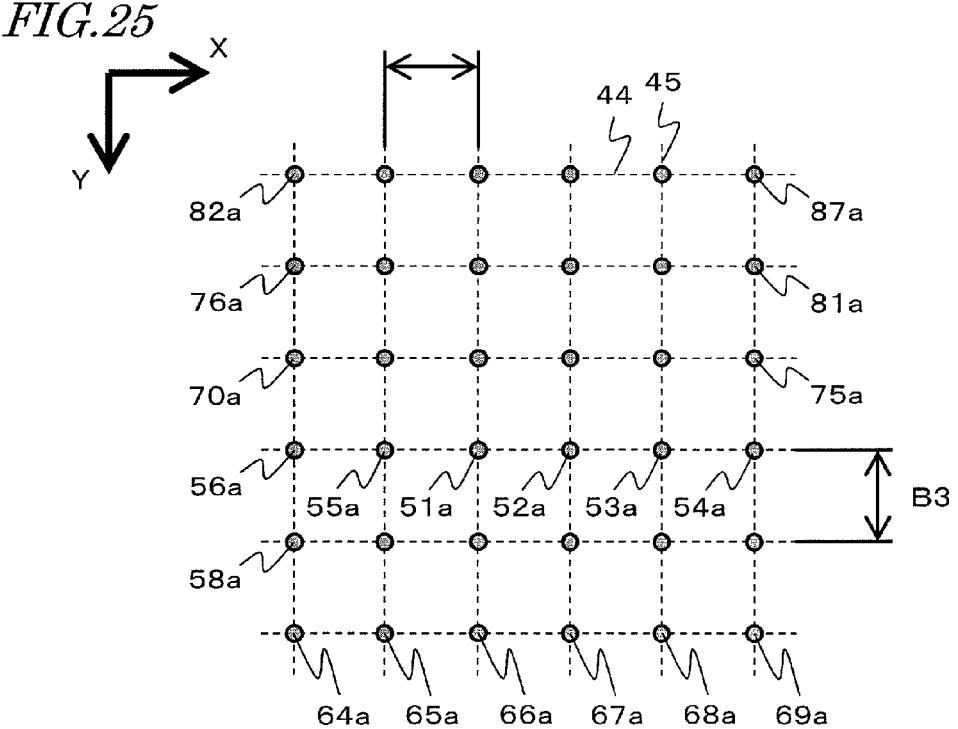
FIG. 25 shows results of calculation of lattice points in step S207.

In FIG. 25, the first reference line 44 and the second reference line 45 are represented by dashed lines, and the positions of the lattice points 50a are represented by gray circles. Positions W1 of the lattice points 51a through 87a located in a 6×6 matrix are represented in the world coordinate system (X,Y) of the display plane 21. As the unit of the world coordinate system (X,Y), actual sizes on the display plane 21 (e.g., unit such as μm or mm) is usable. The origin of the world coordinate system used to specify the positions W1 of the lattice points 51a through 87a is a top left lattice point 82a in consideration of the processes on later stages. Hereinafter, the world coordinate system having the top left lattice point 82a as the origin may be referred to as the "L coordinate system".

Where an interval between the second reference lines 45 in the X-axis direction is B2 and an interval between the first reference lines 44 in the Y-axis direction is B3, B2 and B3 may be set to, for example, 300 μm. In FIG. 25, the top left lattice point 82a is the origin (i.e., I=0, J=0). The coordinate values in the L coordinate system of the lattice point W1[I,J] having a distance of I in the X-axis direction (rightward direction) and a distance of J in the Y-axis direction (downward direction) from the origin, namely, the coordinate values (W1[I,J]X, W1[I,J]Y), can be calculated by use of expression 13.

$$W1[I,J]X = I \cdot B2$$

$$W1[I,J]Y = J \cdot B3 \qquad \text{[Expression 13]}$$

In the above description, the lattice position setting circuitry 16 calculates the lattice point W1[I,J] by use of expression 13. The present disclosure is not limited to this. For example, information representing the lattice point W1[I,J] may be preliminarily stored on an internal memory or the like.

[2-3-8. Effects of the Lattice Position Setting Circuitry 16]

As described above, in this embodiment, the lattice position setting circuitry 16 finds the x-direction and y-direction luminance gradients by use of a Sobel filter shown in expressions 6 and 8 in S201, S202 and S203. In S204, the lattice position setting circuitry 16 calculates the rotation angle at each of the pixels from the ratio of the luminance gradients, and finds the weighted histogram 45 from the calculation results. Owing to this, the rotation angle θ of the black lines 40 can be calculated with high precision.

Next, in S205, the lattice position setting circuitry 16 calculates the position V2, which is rotated by −θ from the position of each dot mark 50 by use of expression 11. The x-axis direction of the position V2 of each dot mark 50 in the pixel coordinate system is identical to the X-axis direction of the world coordinate system of the display plane 21. As a result, in S206, the dot marks 50 located in a 6×6 lattice to form a dot pattern can be easily selected.

The Y-axis direction of the world coordinate system is not known. However, since a left-right shift between adjacent dot marks is checked, the dot marks 51, 52, 53, . . . 87 located in a 6×6 lattice can be accurately selected.

[2-4. Operation of the Dot Mark Decoding Circuitry 17]

Now, with reference to FIG. 26 through FIG. 29, an operation of the dot mark decoding circuitry 17 will be described.

Figure 26:
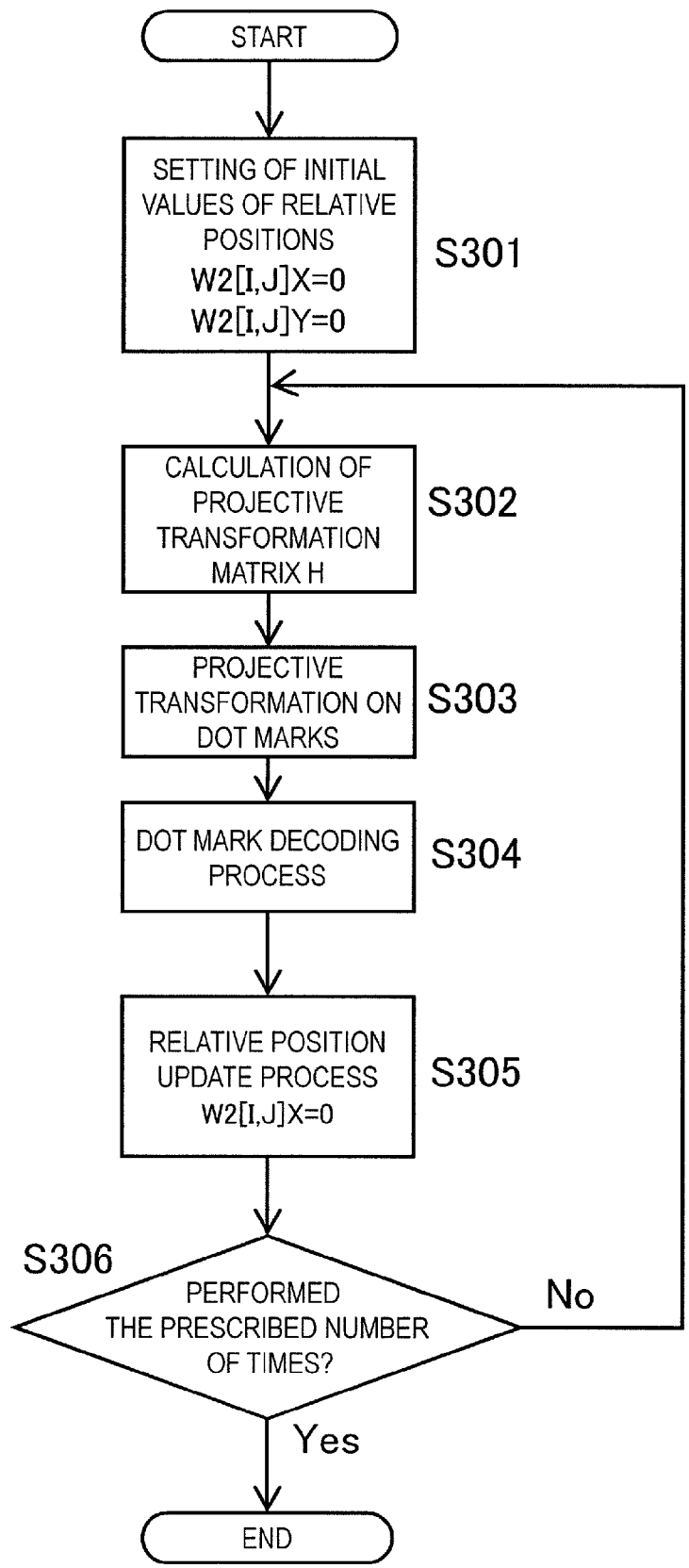
FIG. 26 is a flowchart showing an operation of dot mark decoding circuitry 17.

FIG. 26 is a flowchart showing the operation of the dot mark decoding circuitry 17. Hereinafter, each process of the operation of the dot mark decoding circuitry 17 will be described in order along with the flowchart.

[2-4-1. Setting of Initial Values of Relative Positions (S301)]

First, the dot mark decoding circuitry 17 sets an initial value of a relative position W2[I,J] of each dot mark 50.

In this embodiment, in the L coordinate system (X,Y) of the display plane 21, the position of each lattice point 50a will be represented as "W1[I,J]", and the relative position of each dot mark 50 with respect to the lattice point 50a will be represented as "W2[I,J]". The initial value of the relative position W2[I,J] of the dot mark 50 can be set in accordance with, for example, expression 14.

$$W2[I,J]X=0$$

$$W2[I,J]Y=0 \quad \text{[Expression 14]}$$

[2-4-2. Calculation of the Projective Transformation Matrix (S302)]

A position W3[I,J] of each dot mark 50 in the L coordinate system (X,Y) is found by adding the relative position W2[I,J] to the position W1[I,J] of the corresponding lattice point 50a by use of expression 15.

From expressions 14 and 15, W3[I,J] matches W1[I,J] on the stage of S301.

$$W3[I,J]X=W1[I,J]X+W2[I,J]X$$

$$W3[I,J]Y=W1[I,J]Y+W2[I,J]Y \quad \text{[Expression 15]}$$

Next, the dot mark decoding circuitry 17 performs a projective transformation on the position V1[I,J] in the pixel coordinate system (x,y) of each dot mark 50 into the position W3[I,J] in the L coordinate system (X,Y) in accordance with expression 16.

$$c \cdot \begin{pmatrix} W3[I,J]X \\ W3[I,J]Y \\ 1 \end{pmatrix} = H \begin{pmatrix} V1[I,J]x \\ V1[I,J]y \\ 1 \end{pmatrix} \quad \text{[Expression 16]}$$

In the expression, H is the projective transformation matrix and is a 3×3 matrix shown in expression 17.

$$H = \begin{pmatrix} h_{00} & h_{01} & h_{02} \\ h_{10} & h_{11} & h_{12} \\ h_{20} & h_{21} & 1 \end{pmatrix} \quad \text{[Expression 17]}$$

In expressions 16 and 17, each matrix is represented by a homogeneous coordinate system. In expression 16, "c" in the left side is a coordinate representing a scale factor.

The projective transformation matrix H is a transformation matrix describing the relationship between the pixel coordinate system (x,y) and the L coordinate system (X,Y). As shown in expression 17, the number of unknown constants of the projective transformation matrix H is 8. Therefore, as can be seen from expression 16, the unknown constants of H can be found when the position V1[I,J] in the pixel coordinate system (x,y) and the position W3[I,J] in the L coordinate system (X,Y) of 4 or more dot marks 50 are found.

The dot marks 51, 52, 53, ... 87 located in a 6×6 lattice to form a dot pattern have already been selected. The dot mark decoding circuitry 17 calculates the projective transformation matrix H by a least squares method by use of V1[I,J] of the dot pattern (I=0, 1, 2, 3, 4, 5 and J=0, 1, 2, 3, 4, 5) formed of the 6×6 dot marks 50 and W3[I,J] corresponding thereto.

As described above, in expressions 16 and 17, each matrix is represented by the homogeneous coordinate system. In the left term of expression 16, "c" is a coordinate representing the scale factor. Therefore, in order to find the projective transformation matrix H from expression 16, a nonlinear least squares method is needed. A least squares method generally uses an objective function. In this embodiment, the function shown in expression 18 is used as the objective function.

$$\sum_{I,J} (W3[I,J]X - G[I,J]X^2) + (W3[I,J]Y - G[I,J]Y)^2 \quad \text{[Expression 18]}$$

$$G[I,J]X = \frac{h_{00}V1[I,J]x + h_{01}V1[I,J]y + h_{02}}{h_{20}V1[I,J]x + h_{21}V1[I,J]y + 1}$$

$$G[I,J]Y = \frac{h_{10}V1[I,J]x + h_{11}V1[I,J]y + h_{12}}{h_{20}V1[I,J]x + h_{21}V1[I,J]y + 1}$$

In the expression, G[I,J] represents results obtained by performing a projective transformation on the position V1[I,J] in the pixel coordinate system of each dot mark 50 to the position in the L coordinate system by use of the projective transformation matrix H. The objective function shown in expression 18 is an error sum of squares of the projective transformation results.

The objective function is minimized by solving an eigenvalue using the Lagrange's method of undetermined multipliers. A method of finding a converged solution by use of the Newton's method or the like is generally well known. In this manner, the dot mark decoding circuitry 17 calculates the projective transformation matrix H such that the objective function shown in expression 18 is minimized, namely, such that the error sum of squares of the projective transformation results is minimized.

[2-4-3. Projective Transformation on the Dot Marks (S303)]

Next, the dot mark decoding circuitry 17 actually projects the position V[I,J] of each dot mark 50 in the pixel coordinate system (x,y) on the L coordinate system (X,Y) by use of the projective transformation matrix H calculated in S302. The post-projective transformation position of the dot mark 50 is newly represented as a position W3[I,J]. W3[I,J] is found by expression 19.

$$W3[I,J]X = \frac{h_{00}V1[I,J]x + h_{01}V1[I,J]y + h_{02}}{h_{20}V1[I,J]x + h_{21}V1[I,J]y + 1} \quad \text{[Expression 19]}$$

$$W3[I,J]Y = \frac{h_{10}V1[I,J]x + h_{11}V1[I,J]y + h_{12}}{h_{20}V1[I,J]x + h_{21}V1[I,J]y + 1}$$

Figure 27:
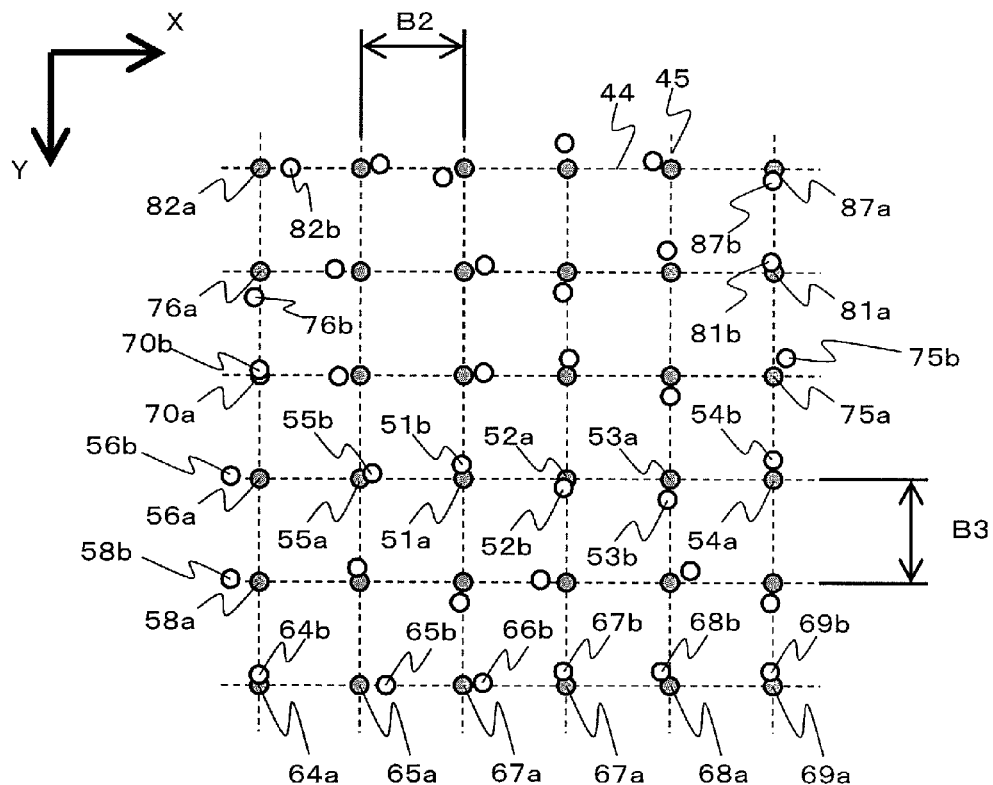
FIG. 27 shows results of projective transformation performed on the dot marks in step S303.

An example of positions W3[I,J] in the L coordinate system of the dot marks 50 calculated by use of expression 19 is represented in FIG. 27 by white circles (51b through 87b). The lattice points 51a through 87a located at an equal interval on the intersections of the first reference lines 44 and the second reference lines 45 are represented by gray circles.

It is seen that 51b through 87b, which are the results of the projective transformation performed on the dot marks 50, are shifted in various directions with respect to the lattice points 51a through 87a.

[2-4-4. Dot Mark Decoding Process (S304)]

Next, the dot mark decoding circuitry 17 compares the post-projective transformation position W1[I,J] of each dot mark 50 calculated by use of expression 19 against the position W1[I,J] of the corresponding lattice point 50a to generate relative position information which represents the positional relationship of each dot mark 50 with respect to the corresponding lattice point 50a. A method for generating the relative position information on each dot mark 50 is defined as, for example, shown in portion (a) of FIG. 28.

In the following description, the "process for generating the relative position information" performed by the dot mark decoding circuitry 17 will be referred to simply as the "decoding process".

As already described, each dot mark 50 on the display plane 21 is located as shown in either one of portions (a) through (d) of FIG. 35. These positional arrangements can be digitized by the quaternary system. Similarly, when the positional relationship (relative positional relationship) of each dot mark 50 with respect to the corresponding lattice point 50a is found, such positional relationship can be digitized by the quaternary system.

Hereinafter, in the description of the operation of the dot mark decoding circuitry 17, the process of "decoding" performed by the dot mark decoding circuitry 17 indicates a process of "assigning different codes to digitize the relative positional relationship".

The dot mark decoding circuitry 17 can execute the decoding process by finding in which direction each dot mark 50 is shifted with respect to the corresponding lattice point 50a.

A difference (DX, DY) between the post-projective transformation position W3[I,J] of each dot mark 50 calculated by use of expression 19 and the position W1[I,J] of the corresponding lattice point 50a is defined by expression 20.

$DX = W3[I,J]X - W1[I,J]X$ $DY = W3[I,J]Y - W1[I,J]Y$ [Expression 20]

The relationship between the difference (DX, DY) and relative position information Q[I,J] of each dot mark 50 is defined by expression 21.

When $|DX|>|DY|$ and $DX<0$, $Q[I,J]=1$

When $|DX|>|DY|$ and $DX \geq 0$, $Q[I,J]=2$

When $|DX| \leq |DY|$ and $DY<0$, $Q[I,J]=0$

When $|DX| \leq |DY|$ and $DY \geq 0$, $Q[I,J]=3$ [Expression 21]

Referring to FIG. 27 again, the dot mark 82 in the pixel coordinate system is projection-transformed to 82b at the top left corner position. In this case, the dot mark 82b is shifted rightward with respect to the lattice point 82a, and therefore is decoded to Q[0, 0]=2. The dot mark 76b below the dot mark 82b is shifted in a leftward and downward direction with respect to the lattice point 76a, but $|DX| \leq |DY|$ and $DY \geq 0$. Therefore, the dot mark 76b is decoded to Q[0, 1]=3.

The dot mark 75b is shifted in a rightward and upward direction with respect to the lattice point 75a, but $|DX| \leq |DY|$ and $DY<0$. Therefore, the dot mark 75b is decoded to Q[5, 2]=0. In this manner, the dot mark decoding circuitry 17 compares the positions of 51b through 87b, which are the results of projective transformation performed on the dot marks 50, against the positions of the lattice points 51a through 87a to execute the decoding process.

Figure 28:
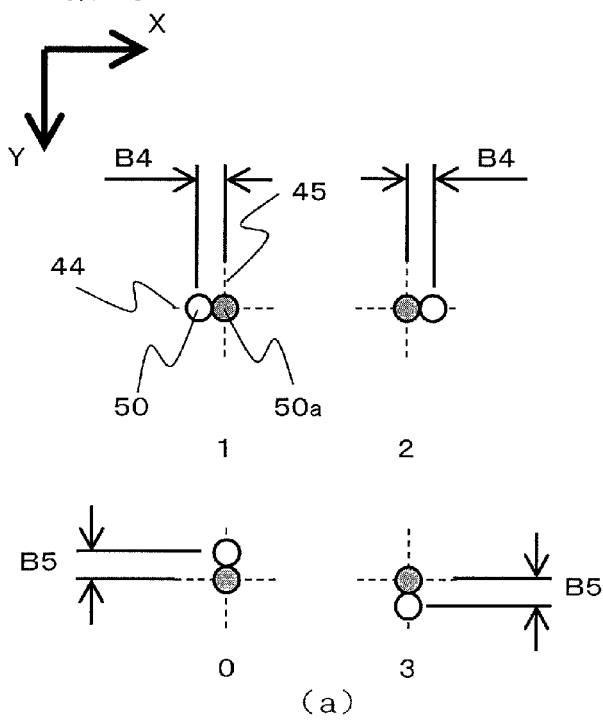
FIG. 28 shows results of a dot mark decoding process performed in step S304.

Portion (b) of FIG. 28 shows results of the decoding process performed on the dot pattern formed of the 6×6 dot marks 50.

[2-4-5. Relative Position Update Process (S305)]

Next, the dot mark decoding circuitry 17 updates the relative position W2[I,J] of each dot mark 50 in the L coordinate system in accordance with the relative position information Q[I,J] of the dot mark 50 decoded in accordance with the definition of expression 21.

The position coding method for the dot marks 50 is as shown in portion (a) of FIG. 28. Each dot mark 50 is shifted in either one of four directions in accordance with the four numerical figures of 0, 1, 2 and 3. A shift amount B4 in the X-axis direction and a shift amount B5 in the Y-axis direction are predefined as, for example, B4=B2/6 and B5=B3/6. B2 and B3 are respectively an interval between the second reference lines 45 in the X-axis direction and an interval between the first reference lines 44 in the Y-axis direction. When, for example, B2 and B3 are each set to 300 μm, B4 and B5 are each 50 μm. The relationship between the relative position information Q[I,J] and the update of the coordinate values of the relative position W2[I,J] is defined by expression 22.

When $Q[I,J]=1$, $W2[I,J]X=-B4$, $W2[I,J]Y=0$

When $Q[I,J]=2$, $W2[I,J]X=B4$, $W2[I,J]Y=0$

When $Q[I,J]=0$, $W2[I,J]X=0$, $W2[I,J]Y=-B5$

When $Q[I,J]=3$, $W2[I,J]X=0$, $W2[I,J]Y=B5$ [Expression 22]

Figure 29:
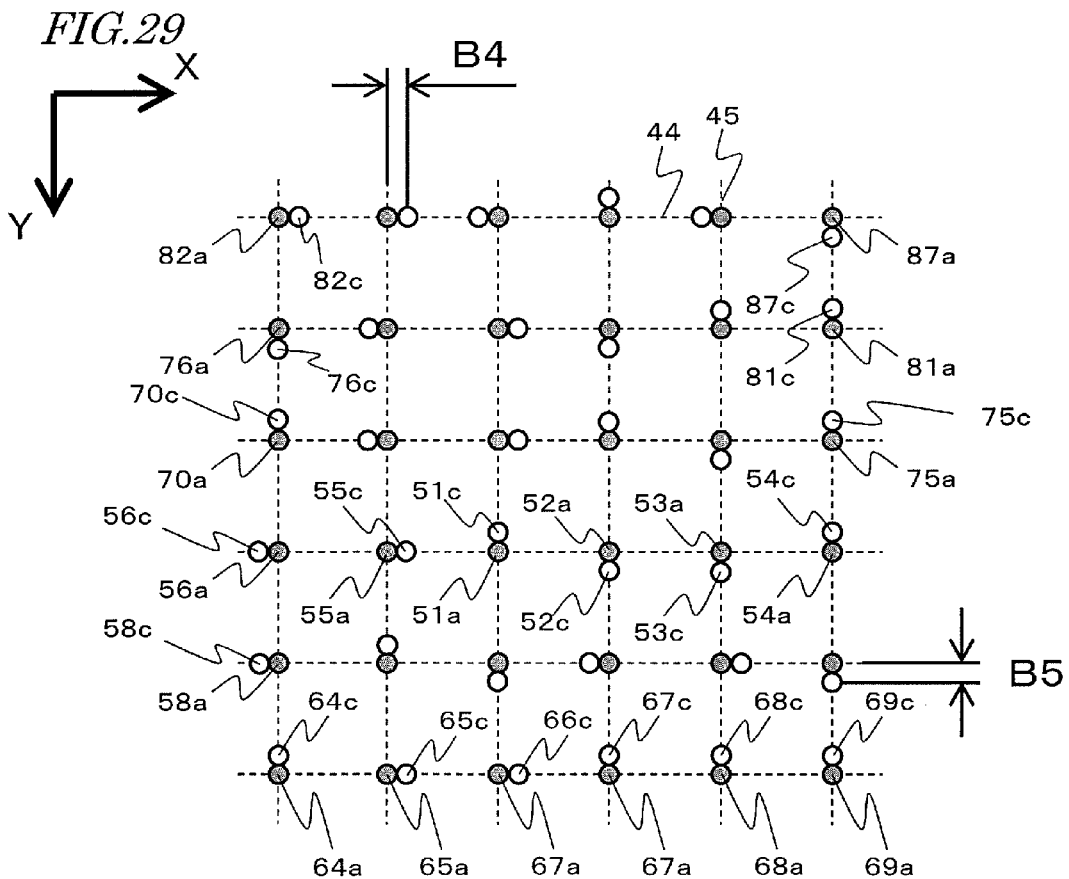
FIG. 29 shows results of a relative position update process performed in step S305.

The dot mark decoding circuitry 17 updates the relative position W2[I,J] of each dot mark 50 in accordance with expression 22. In FIG. 29, the results of calculation of the positions W3[I,J] of the dot marks 50 performed in accordance with expression 15 as white circles.

Now, FIG. 27 and FIG. 29 will be compared. Referring to FIG. 27, 51b through 87b, which are the results of the projective transformation performed on the dot marks 50, are not necessarily existent on the first reference lines 44 or the second reference lines 45 due to the influence of calculation (rounding) errors, detection errors or the like. For example, the dot mark 55b is shifted in a rightward and upward direction with respect to the lattice point 55a.

By contrast, in FIG. 29, a dot mark 55c is existent on the first reference line 44 extending in the X-axis direction, and is not shifted in the Y-axis direction.

In FIG. 27, the distances between the dot marks 51b through 87b and the lattice points 51a through 87a are not uniform. By contrast, in FIG. 29, the distances between dot marks 51c through 87c and the lattice points 51a through 87a are uniform.

The results of projective transformation performed on the dot marks 50 shown in FIG. 27 are influenced by calculation (rounding) errors, detection errors or the like. By contrast, the positions of 51c through 87c (FIG. 29) found by expression 15 by use of the results of update performed on the relative position W2[I,J] in accordance with expression 22, after the decoding performed on each dot mark 50 in accordance with expression 21, are positions at which the dot marks 50 are expected to be existent.

[2-4-6. Repetition of the Process (S306)]

In S305, the positions at which the dot marks 50 are expected to be existent in the L coordinate system (X,Y) are made clear. Therefore, a higher calculation precision of the projective transformation matrix H in S305 is pursued by use of these results. Specifically, the dot mark decoding circuitry 17 executes the processes in S302 through S305 in repetition.

In S301, the initial values of the relative positions W2[I,J] are all set to zero. Therefore, the initial values of the positions W3[I,J] of the dot marks 50 calculated in accordance with expression 15 completely match the positions W1[I,J] of the lattice points 50a. The projective transformation matrix H found in S302 is a projective transformation matrix from the dot marks 57 through 87 in the pixel coordinate system (x,y) shown in FIG. 24 to the lattice points 51a through 87a in the L coordinate system (X,Y) shown in FIG. 25.

In the repeated processes, the dot mark decoding circuitry 17 updates the relative positions W2[I,J] and re-calculates the positions W3[I,J] in accordance with expression 15 in S305. In S302, the dot mark decoding circuitry 17 re-calculates the projective transformation matrix H. This indicates finding a projective transformation matrix from the dot marks 57 through 87 in the pixel coordinate system (x,y) shown in FIG. 24 to the dot marks 51c through 87c in the L coordinate system (X,Y) shown in FIG. 29. A projective transformation matrix usable for transformation to the positions at which the dot marks 50 are expected to be existent can be calculated.

As described above, the dot mark decoding circuitry 17 executes the processes in S302 through S305 in repetition, and as a result, projective transformation matrix H providing a higher transformation precision can be obtained.

In step S306, it is monitored whether a prescribed condition has been fulfilled or not. The prescribed condition may be, for example, the number of times of repetition. The number of times of repetition may be predefined. For example, the repetition may be finished after the processes are executed five times. Alternatively, the prescribed condition may be that the relative position information is converged to a prescribed range. For example, the repetition may be finished when the relative position information Q[I,J] of the dot marks 50 in S304 is the same before and after the repeated processes. By executing the processes in repetition until the prescribed condition is fulfilled, the transformation precision of the projective transformation matrix H is further improved.

[2-4-7. Effects of the Dot Mark Decoding Circuitry 17]

As described above, in this embodiment, the dot mark decoding circuitry 17 sets the initial value of the relative position W2[I,J] of each dot mark 50 with reference to the corresponding lattice point 50a (S301). Then, the dot mark decoding circuitry 17 sequentially executes the calculation process (step S302), the transformation process (step S303), the generation process (step S304) and the update process (step S305) in repetition until a prescribed condition is fulfilled. In the calculation process, the projective transformation matrix H is calculated based on the position V1[I,J] of each dot marks 50 in the pixel coordinate system (x,y) and the position W3[I,J] obtained by adding the relative position W2[I,J] to the position W1[I,J] of the corresponding lattice point 50a. In the transformation process, the position of each dot mark 50 in the pixel coordinate system is transformed to the position in the L coordinate system by use of the projective transformation matrix H. In the generation process, the relative position information is generated based on the post-transformation position W3[I,J] of each dot mark 50 and the position W1[I,J] of the corresponding lattice point 50a. In the update process, the relative position W2[I,J] is updated in accordance with the relative position information.

As a result, the dot mark decoding circuitry 17 calculates the projective transformation matrix H in repetition while updating the relative positions W2[I,J]. Therefore, a projective transformation matrix providing a higher transformation precision can be obtained.

The projective transformation matrix H describes the relationship between the pixel coordinate system (x,y) and the L coordinate system (X,Y). In other words, the projective transformation matrix H represents the inter-plane positional relationship between the display plane 21 and the imaging area of the image sensor 14.

The image sensor 14 is an element of the electronic pen 10. The projective transformation matrix H represents the inclination, rotation and position of the electronic pen 10 with respect to the display plane 21. Therefore, when the projective transformation matrix H is found with high precision, the position information on the electronic pen 10 can be calculated with high precision with the influence of the inclination or the rotation of the electronic pen 10 being accurately considered. The position information on the electronic pen 10 is calculated by the position information calculating circuitry 18 described later.

[2-5. Operation of the Position Information Calculating Circuitry 18]

As a last element of the electronic pen 10, with reference to FIGS. 30 and 31, an operation of the position information calculating circuitry 18 will be described.

Figure 30:
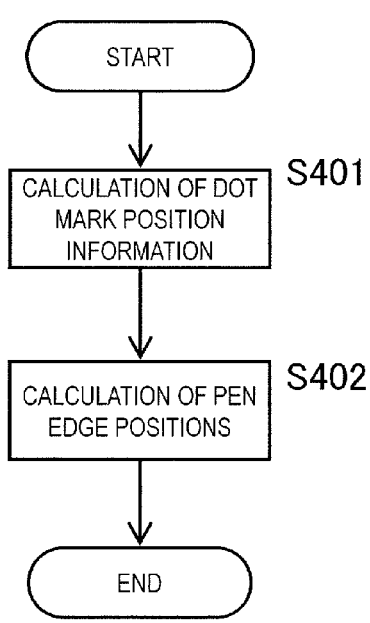
FIG. 30 is a flowchart showing an operation of position information calculating circuitry 18.

FIG. 30 is a flowchart showing the operation of the position information calculating circuitry 18. Hereinafter, each process of the operation of the position information calculating circuitry 18 will be described in order along with the flowchart.

[2-5-1. Calculation of Dot Mark Position Information (S401)]

The relative position information Q[I,J] on each dot mark 50 found in S304 by the dot mark decoding circuitry is transmitted to the position information calculating circuitry 18. The relative position information on the dot pattern formed of the 6×6 dot marks 50 is transmitted in a matrix form as shown in portion (b) of FIG. 28.

As already described, the dot patterns for different positions on the display plane 21 are all different. By specifying the dot pattern, the position thereof on the display plane 21 can be specified.

The position information calculating circuitry 18 finds position information on each dot mark 50 by use of the relative position information Q[I,J]. For example, the position information calculating circuitry 18 may decode the position information which is coded in a quaternary system of 36 (6×6) digits. As a method for coding or decoding to information pattern, a known technique is usable. For example, a method disclosed in Japanese PCT National Phase Laid-Open Publication No. 2003-511762 is usable.

In this manner, the position information calculating circuitry 18 obtains the position information on the plurality of dot marks 50 from the relative position information Q[I,J] on the dot marks 50. Specifically, the position information calculating circuitry 18 obtains coordinate values [Xg,Yg] in the world coordinate system [X,Y] of the top left lattice point 82a shown in FIG. 25. The present disclosure is not limited to this. For example, the position information calculating circuitry 18 may obtain coordinate values [Xg,Yg] in the world coordinate system [X,Y] of the top right lattice point 87a shown in FIG. 25.

[2-5-2. Calculation of Pen Tip Positions (S402)]

The user operating the electronic pen 10 puts the pen tip of the pen tip section 32 into contact with the display plane 21 to input a letter or the like. In order to cause the letter or the like input by the user to be displayed on the display plane 21, it is necessary to grasp the position on the display plane 21 at which a pen tip position 35 of the pen tip section 32 is located.

Figure 31:
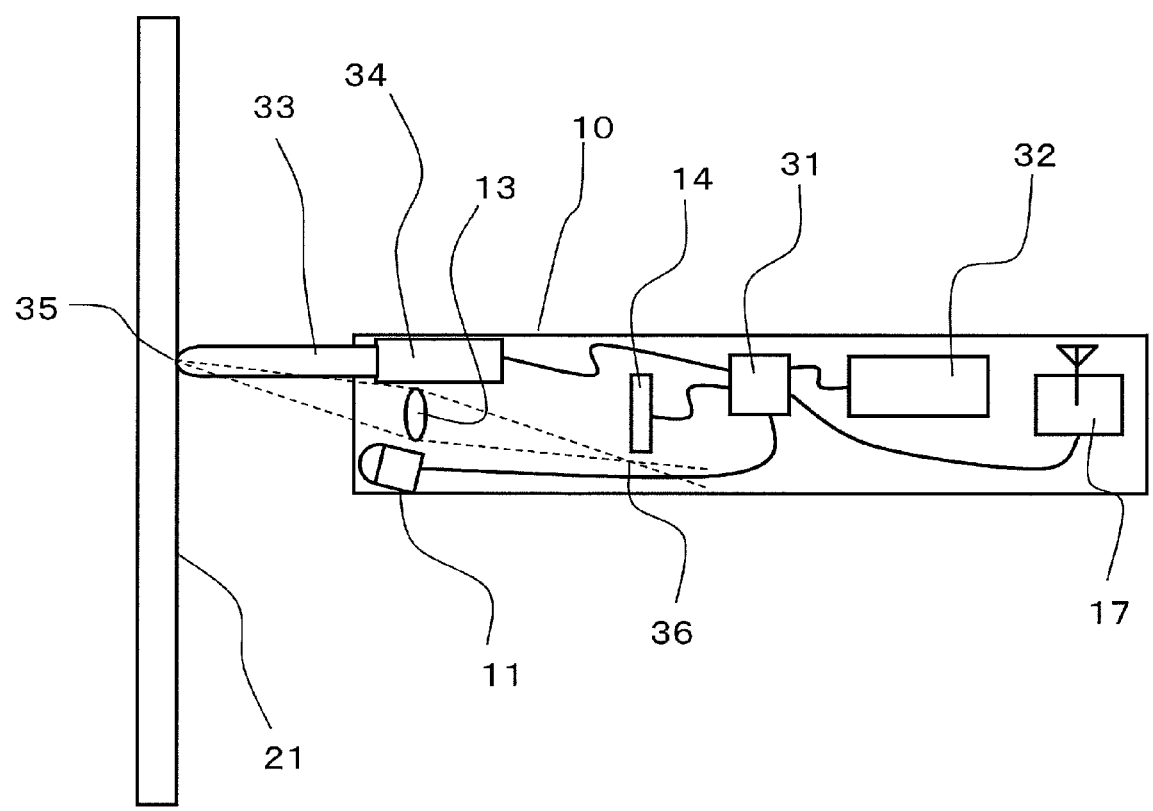
FIG. 31 is a cross-sectional view of the electronic pen 10 which shows a position 36 of a pen tip position 35 on an imaging area.

As shown in FIG. 31, the position information calculating circuitry 18 finds a position 36 corresponding to the position where an image of the pen tip position 35 is optically formed (image formation position-corresponding position 36), and calculates the position of the image formation position-corresponding position 36 in the pixel coordinate system (x,y) (i.e., calculates the position (xp,yp)) in advance. The position information calculating circuitry 18 calculates, as the image formation position-corresponding position 36, the position on the imaging area of the image sensor 14 at which an image of the pen tip position 35 is optically formed via the objective lens 13. The image formation position-corresponding position 36 is uniquely found based on the focal length of the objective lens 13, the positional relationship between the objective lens 13 and the image sensor 14, the length of pen tip section 32 or the like.

The image formation position-corresponding position 36 does not need to be in an image capturing range of the image sensor 14. In an actual calculation, in the case where the image size of the image sensor 14 is (240,240), (xp,yp)= (120,−569), for example. This image formation position-corresponding position 36 is not changed in the pixel coordinate system (x,y) even when the electronic pen 10 is inclined and/or rotated.

A position (Xp,Yp) in the L coordinate system of the pen tip position 35 can be calculated by expression 23 by use of the projective transformation matrix H already calculated by the dot mark decoding circuitry 17.

$$c \cdot \begin{pmatrix} Xp \\ Yp \\ 1 \end{pmatrix} = H \begin{pmatrix} xp \\ yp \\ 1 \end{pmatrix}$$ [Expression 23]

The position (Xp,Yp) in the L coordinate system which is found by expression 23 is with respect to the top left lattice point 82a shown in FIG. 25 as the origin. Therefore, absolute coordinates in the world coordinate system of the pen tip position 35 on the actual display plane 21 is (Xp+Xg,Yp+Yg).

[2-5-3. Effects of the Position Information Calculating Circuitry 18]

As described above, in this embodiment, the position information calculating circuitry 18 can calculate the position of the pen tip position 35 of the pen tip section 32 on the display plane 21 based on the image formation position-corresponding position 36, which is the position on the imaging area of the image sensor 14 at which an image of the pen tip position 35 of the pen tip section 32 is optically formed, the projective transformation matrix H, and the coordinate values (Xg,Yg) of the lattice point 82a in the world coordinate system (X,Y). Therefore, even when the inclination or the rotation of the electronic pen is changed during a handwriting input operation, the position information calculating circuitry 18 can calculate the accurate position of the pen tip by use of the projective transformation matrix H, which reflects the change of the state of the electronic pen such as the inclination or the rotation.

In this embodiment, in the world coordinate system, the pixel coordinate system and the L coordinate system, the top left corner is the origin. The present disclosure is not limited to this. It is sufficient as long as the position V1[I,J] of each dot mark 50 can be transformed from the position on the shot image to the position on the display plane 21 by use of a transformation matrix. The coordinate systems may be set in an optional way. The origin of each of the above-described coordinate systems may be optionally defined, and a coordinate system other than the above-described coordinate systems may be defined.

[3-1. Effects]

As described above, in this embodiment, the handwriting input system 100 determines a designated position which is designated by a user on a display plane 21. The designated position is associated with a plurality of dot marks 50. The plurality of dot marks 50 are a part of a great number of dot marks on the display plane 21 and are formed with respect to a plurality of lattice points 50a. A position of one of the plurality of dot marks 50 is coded by the plurality of dot marks 50. The handwriting input system 100 specifies the position by reading the plurality of dot marks 50. The handwriting input system 100 includes the image sensor 14 configured to capture an image of the plurality of dot marks 50; the dot mark position detecting circuitry 15 configured to detect positions of the plurality of dot marks 50 in an image which has been captured as positions in the pixel coordinate system of the image; the dot mark decoding circuitry 17 configured to generate relative position information based on the positions of the plurality of dot marks 50 which is detected by the dot mark position detecting circuitry 15 and positions of the plurality of lattice points 50a, wherein a L coordinate system different from the pixel coordinate system is defined by the plurality of lattice points 50a, the relative position information represents a positional relationship of the plurality of dot marks 50 in the L coordinate system with respect to the plurality of lattice points 50a, and the plurality of dot marks 50 in the L coordinate system correspond to the plurality of dot marks 50 in the pixel coordinate system; and the position information calculating circuitry 18 configured to calculate the position on the display plane 21 based on the relative position information. The dot marks decoding circuitry 17 is configured to set initial values of the relative positions of the plurality of dot marks 50 with respect to the plurality of lattice points 50a; then execute the calculation process of calculating the projective transformation matrix H based on the positions of the plurality of dot marks 50 in the pixel coordinate system and positions obtained by adding the relative positions to the positions of the lattice points 50a; execute the transformation process of transforming the positions of the plurality of dot marks 50 from the positions in the pixel coordinate system to the positions in the L coordinate system by use of the projective transformation matrix H; execute the generation process of generating the relative position information based on the post-transformation positions of the plurality of dot marks 50 and the positions of the plurality of lattice points 50a; execute the update process of updating the relative positions in accordance with the relative position information; and sequentially execute the calculation process, the transformation process, the generation process and the update process in repetition until a prescribed condition is fulfilled.

As a result, a projective transformation matrix H providing a high transformation precision can be obtained. Thus, even when the electronic pen is inclined and/or rotated during the handwriting input operation, accurate position information on the dot marks can be obtained.

The dot mark decoding circuitry 17 sequentially executes the calculation process, the transformation process, the generation process and the update process in repetition until the number of times of repetition reaches, for example, five. Alternatively, the dot mark decoding circuitry 17 sequentially executes the calculation process, the transformation process, the generation process and the update process in repetition until a result of generation of the relative position information stops changing.

The handwriting input system 100 further includes the lattice position setting circuitry 16 configured to set positions of the plurality of lattice points 50a.

The handwriting input system 100 further includes the pen 10 configured to designate a position on the display plane 21. The position information calculating circuitry 18 calculates the designated position based on a position of the pen 10 in the L coordinate system, obtained by transforming a position of the pen 10 in the pixel coordinate system by use of the projective transformation matrix H, and the relative position information.

In this embodiment, the handwriting input system 100 determines a designated position which is designated by a user on a display plane 21. The designated position is associated with a plurality of dot marks 50. The plurality of dot marks 50 are a part of a great number of dot marks on the display plane 21 and are formed with respect to a plurality of lattice points 50a. A position of one of the plurality of dot marks 50 is coded by the plurality of dot marks 50. The handwriting input system 100 specifies the position by reading the plurality of dot marks 50. The handwriting input system 100 includes the image sensor 14 configured to capture an image of the plurality of dot marks 50; the dot mark position detecting circuitry 15 for detecting positions of the plurality of dot marks 50 in an image which has been captured; the dot mark decoding circuitry 17 configured to generate relative position information based on the positions of the plurality of dot marks 50 which is detected by the dot mark position detecting circuitry 15 and positions of the plurality of lattice points 50a, wherein the relative position information represents a positional relationship of the plurality of dot marks 50 on the display plane 21 with respect to the plurality of lattice points 50a, and the plurality of dot marks 50 on the display plane 21 correspond to the plurality of dot marks 50 in the picked up image; and the position information calculating circuitry 18 configured to calculate the position on the display plane 21 based on the relative position information. The dot mark decoding circuitry 17 is configured to set initial values of relative positions of the plurality of dot marks 50 with respect to the plurality of lattice points 50a; then execute the calculation process of calculating the transformation matrix based on the positions of the plurality of dot marks 50 in the picked up image and positions obtained by adding the relative positions to the positions of the lattice points 50a; execute the transformation process of transforming the positions of the plurality of dot marks 50 from the positions in the picked up image to the positions on the display plane 21 by use of the transformation matrix; execute the generation process of generating the relative position information based on the post-transformation positions of the plurality of dot marks 50 and the positions of the virtual points 50a; execute the update process of updating the relative positions in accordance with the relative position information; and sequentially execute the calculation process, the transformation process, the generation process and the update process in repetition until a prescribed condition is fulfilled.

As a result, a transformation matrix providing a high transformation precision can be obtained. Even when the electronic pen is inclined and/or rotated during the handwriting input operation, accurate position information on the dot marks can be obtained.

4. Other Embodiments

So far, Embodiment 1 has been described as an example of technology disclosed in this application. The technology in the present disclosure is not limited to this, and is applicable to other embodiments with optional changes, replacements, additions, deletions and the like. In addition, the elements described in Embodiment 1 may be combined to provide another embodiment.

Hereinafter, other embodiments will be described.

[4-1. Modification of the Handwriting Input System 100]

Figure 32:
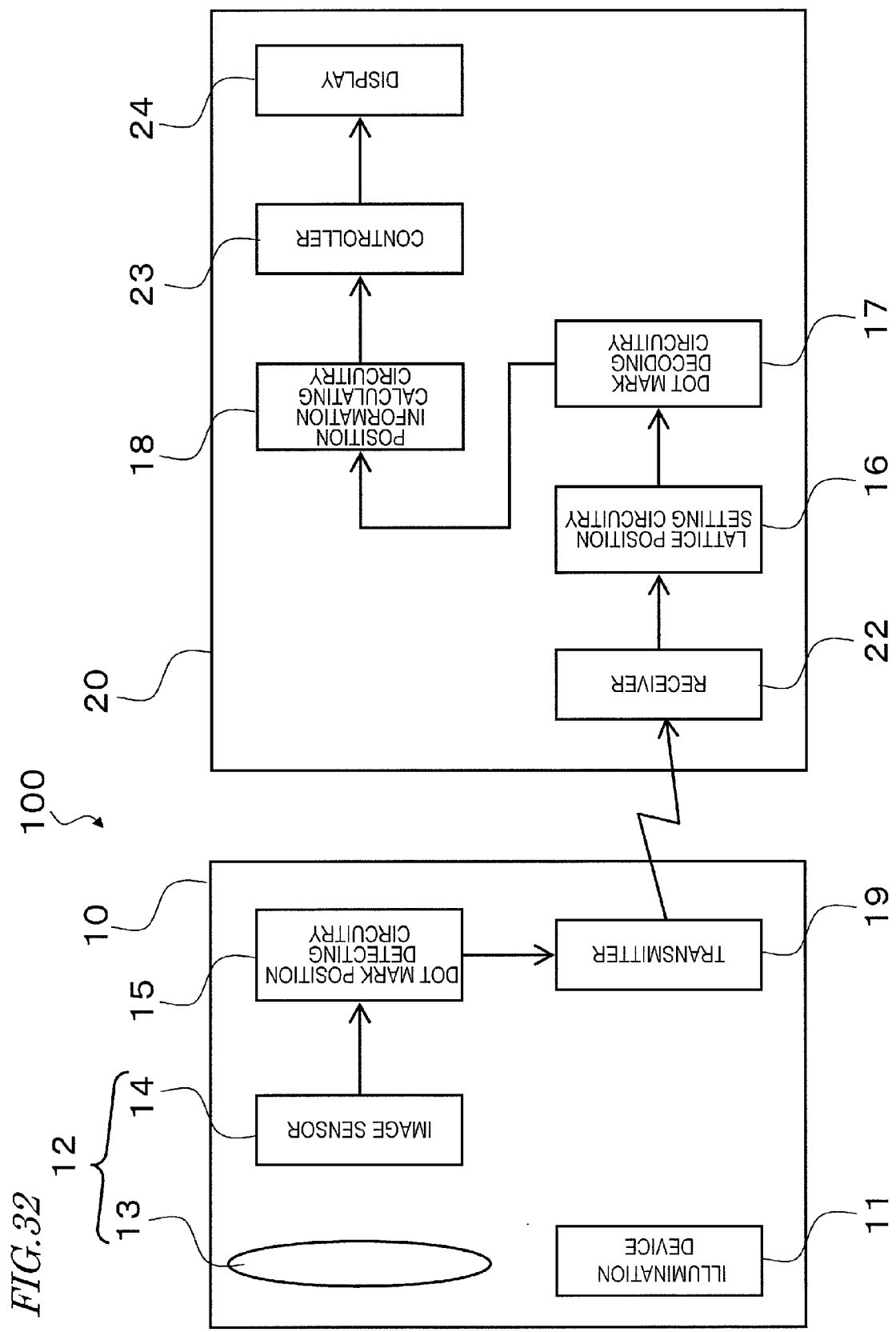
FIG. 32 is a block diagram showing a modification of the electronic pen 10 and the handwriting input system 100.

FIG. 32 is a block diagram showing a modification of the handwriting input system 100. Hereinafter, the modification of the handwriting input system 100 shown in FIG. 32 will be described in comparison with the handwriting input system 100 shown in FIG. 2. In the handwriting input system 100 shown in FIG. 2, the electronic pen 10 includes the dot mark position detecting circuitry 15, the lattice position setting circuitry 16, the dot mark decoding circuitry 17 and the position information calculating circuitry 18. The present disclosure is not limited to this. A part of, or the entirety of, these elements may be provided in the display device 20. In the modification shown in FIG. 32, the dot mark position detecting circuitry 15 is provided in the electronic pen 10, whereas the lattice position setting circuitry 16, the dot mark decoding circuitry 17 and the position information calculating circuitry 18 are provided in the display device 20.

As described above in Embodiment 1, an image signal processor having the elements mounted on one chip may be provided in the display device 20.

Alternatively, an image signal processor including at least one of the elements may be provided in the electronic pen 10 or the display device 20. In this manner, the block diagram of the handwriting input system 100 may be appropriately determined in accordance with designing specifications or the like.

[4-2. Modification of S301]

As shown in expression 14 used in S301, the initial values of the relative positions W2[I,J] of the dot marks 50 are all set to zero. The operation of the electronic pen 10 and the handwriting input system 100 is executed in repetition at a prescribed cycle (e.g., every frame time interval of the image sensor 14). Therefore, the calculation results obtained by the immediately previous operation can be used for the initial values of the current operation. The initial values of the relative positions W2[I,J] in S301 in the current operation may be the final update results obtained in S304 in the immediately previous calculation.

[4-3. Modification of S303]

In S302 in Embodiment 1, the projective transformation matrix H is found by a nonlinear least squares method. The present disclosure is not limited to this. The projective transformation matrix H may be calculated by use of a linear least squares method using a pseudo-inverse matrix, instead of the nonlinear least squares method. By erasing the scale factor c of the homogeneous coordinate system from expression 16, expression 24 is obtained.

$$\begin{pmatrix} W3[I,J]X \\ W3[I,J]Y \end{pmatrix} = \quad \text{[Expression 24]}$$

$$\begin{pmatrix} V1[I,J]x & 0 \\ V1[I,J]y & 0 \\ 1 & 0 \\ 0 & V1[I,J]x \\ 0 & V1[I,J]y \\ 0 & 1 \\ -W3[I,J]X \cdot V1[I,J]x & -W3[I,J]X \cdot V1[I,J]y \\ -W3[I,J]Y \cdot V1[I,J]x & -W3[I,J]Y \cdot V1[I,J]y \end{pmatrix}^T$$

$$\begin{pmatrix} h_{00} \\ h_{01} \\ h_{02} \\ h_{10} \\ h_{11} \\ h_{12} \\ h_{20} \\ h_{21} \end{pmatrix}$$

Since the left side and the first term of the right side of expression 24 are already known, each element hii (second term of the right side) of the projective transformation matrix H can be calculated by a pseudo-inverse matrix calculation.

A linear least squares method has the following advantages over a nonlinear least squares method.

(1) The processing time can be shortened; and (2) the load of the computation process is alleviated and also the circuit scale of hardware can be reduced.

The technology of the present disclosure is also applicable to software (program) which defines the above-described decoding process on the dot marks 50. The operation defined by such a program is as shown in, for example, FIG. 26 or FIG. 33 described later. Alternatively, the operation defined by such a program may be a series of operations including the operations shown in FIGS. 4, 15, 26 and 30 in combination. Such a program may be provided as being recorded on a removable storage medium or may be provided via an electric communication line. A processor built in a computer executes such a program, and thus the operations described in the above embodiment can be performed.

[4-4. Modification of S305]

Figure 33:
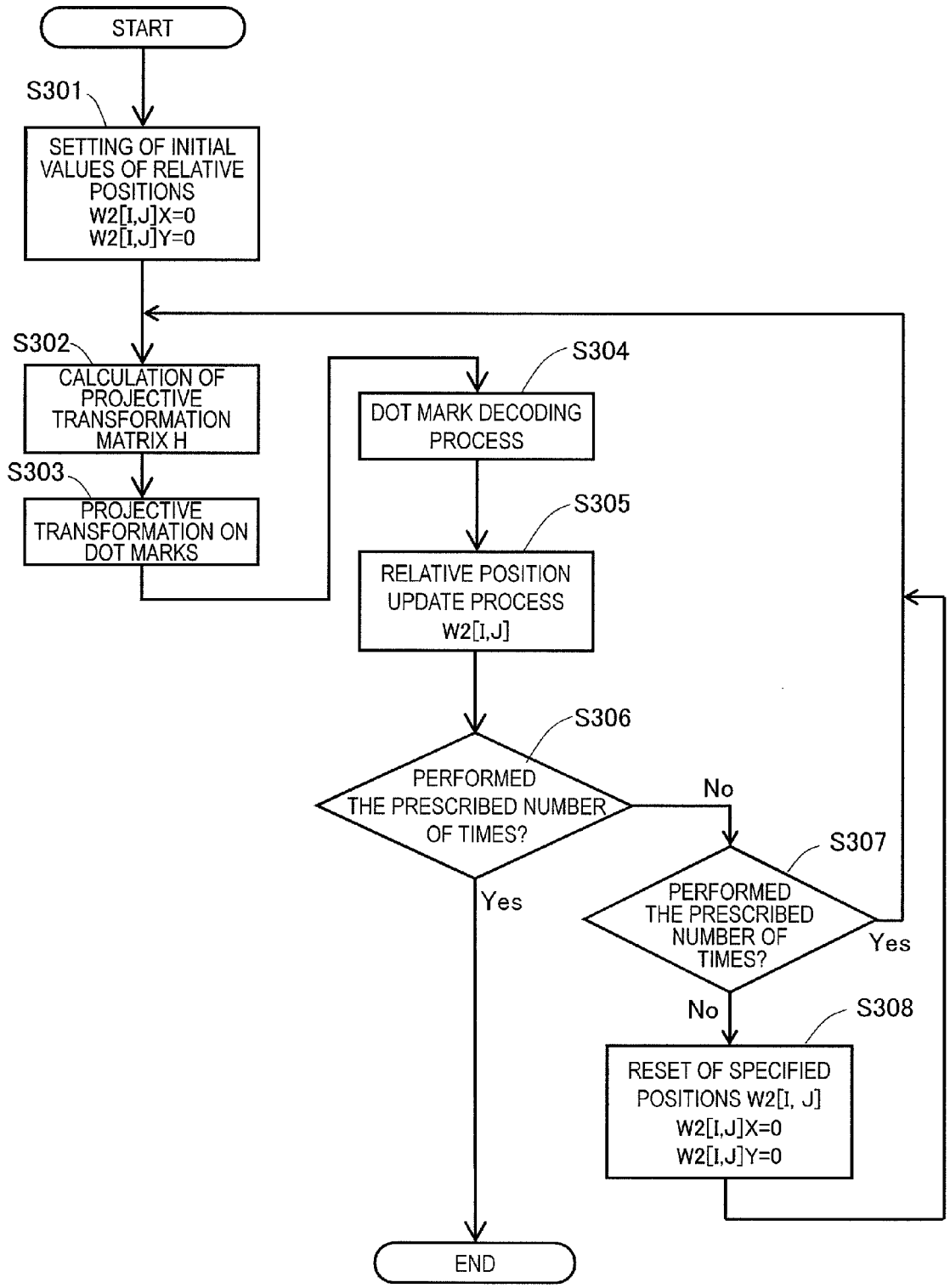
FIG. 33 is a flowchart showing a modification of the operation of the dot mark decoding circuitry 17.

FIG. 33 is a modification of the flowchart in FIG. 26, which shows the operation of the dot mark decoding circuitry 17. The flowchart in FIG. 33 includes steps S307 and S308 in addition to the flowchart shown in FIG. 26. Except for this, the flowchart in FIG. 33 is the same as that in FIG. 26.

In the relative position update process in S305 in Embodiment 1, the coordinate values of the relative positions W2[I,J] of the 6×6 dot marks 50 are updated in accordance with expression 22. The present disclosure is not limited to this. The relative positions W2[I,J] of a part of the dot marks 50 may be updated to other numerical figures, or may not be updated. In other words, when the number of times of repetition is less than a prescribed value, the dot mark decoding circuitry 17 executes an invalidation process of invalidating the update of the relative positions of specific positions (12 points at the four corners) after the relative position update process in S305.

For example, the dot mark decoding circuitry 17 may update the 12 points at the four corners of the dot pattern located in a lattice by use of expression 14. As shown in step S308 in FIG. 33, this indicates that after the relative positions W2[I,J] of all the dot marks 50 are updated in S305, the update of the relative positions W2[I,J] of the dot marks 50 at the specific positions (12 points at the four corners) is invalidated, namely, reset.

As shown in step S307 in FIG. 33, such a process is preferably finished before or when the number of times of repetition of S302 through S305 reaches a prescribed value. For example, only when the number of times of repetition is less than two, the dot mark decoding circuitry 17 executes step S308.

Alternatively, for example, at the time of the first operation of S305, the dot mark decoding circuitry 17 applies expression 14 for the 12 points at the four corners and applies expression 22 for the other 24 points. The 12 points at the four corners are the dot marks 58, 64, 65, 68, 69, 63, 76, 82, 83, 81, 86 and 87. According to the flowchart in FIG. 33, the dot mark decoding circuitry 17 performs step S308 only on the 12 points at the four corners.

At the time of the second operation of S305, the dot mark decoding circuitry 17 applies expression 14 for four points at the four corners and applies expression 22 for the other 32 points. The four points at the four corners are dot marks 64, 69, 82 and 87. According to the flowchart in FIG. 33, the dot mark decoding circuitry 17 performs step S308 only on the four points at the four corners at the time of the second operation of S305. At the time of the third and subsequent operations of S305, the dot mark decoding circuitry 17 applies expression 22 for all the 36 points. According to the flowchart in FIG. 33, the dot mark decoding circuitry 17 does not perform step S308 at the time of the third and subsequent operations of S305.

This concept may be expanded such that the calculation is not performed, namely, S302 through S305 are skipped, on a part of the dot marks 50. Namely, while the number of times of repetition of S302 through S305 is 1, the dot mark decoding circuitry 17 performs all the calculations of S302 through S305 by use of the 24 points other than the 12 points at the four corners. At the second time of repetition, the dot mark decoding circuitry 17 performs all the calculations by use of the 32 points other than the four points at the four corners. At the third or subsequent time of repetition, the dot mark decoding circuitry 17 may perform calculations by use of all the 36 points.

In the processes performed by the dot mark decoding circuitry 17, if the update of the relative positions of the lattice points at the four corners (e.g., four points) is performed in an erroneous manner, this error exerts a significant influence on the calculation of the projective transformation matrix H. As a result, projective transformation matrix H providing a high transformation precision cannot be obtained.

As described above, in the modification of S305 in Embodiment 1, when the number of times of repetition is less than 2, the dot mark decoding circuitry 17, after executing the update process, executes the invalidation process of invalidating the update process on the relative positions of the specific lattice points among the plurality of lattice points 50a.

The plurality of lattice points 50a in the L coordinate system are located in a m×m lattice, and the specific lattice points are the points at the four corners of the m×m lattice.

As a result, according to the flowchart shown in FIG. 33, when the number of times of repetition is less than a prescribed value (e.g., 1), the update of the relative positions of the lattice points at the four corners performed in S305 is invalidated in step S308. Therefore, until the number of times of repetition reaches the prescribed value, the relative positions of the lattice points at the four corners remain the initial values. Owing to this, the calculation error of the projective transformation matrix H can be suppressed, and thus a projective transformation matrix H providing a high transformation precision can be obtained.

As described above, Embodiment 1 has been described as an example of technology of the present disclosure. The attached drawings and the detailed description are provide for the purpose of the explanation.

Therefore, the elements shown in the attached drawings and the detailed description include elements which are not indispensable to solve the problems but are provided in order to explain the technology, as well as elements which are indispensable to solve the problems. Although such elements which are not indispensable are shown in the attached drawings and the detailed description, such elements are not to be deemed to be indispensable.

The above-described embodiments are provided in order to explain the technology of the present disclosure, and may be subjected to various changes, replacements, additions, deletions or the like in the claims or the equivalents thereof.

The present disclosure is applicable to an electronic pen and a handwriting input system using the same. Specifically, the present disclosure is applicable to an electronic device such as a notebook computer, a mobile tablet and the like. The present disclosure is also applicable to an electronic pen for outputting, as data, pen strokes input on a sheet of paper by use of the electronic pen. The present disclosure is further applicable to an electronic whiteboard system including a liquid crystal display.

While the present disclosure has been described with respect to preferred embodiments thereof, it will be apparent to those skilled in the art that the disclosed disclosure may be modified in numerous ways and may assume many embodiments other than those specifically described above. Accordingly, it is intended by the appended claims to cover all modifications of the disclosure that fall within the true spirit and scope of the disclosure.

Japanese Patent Application No. 2012-193786 filed in the Japanese Patent Office on Sep. 4, 2012 and Japanese Patent Application No. 2013-133603 filed in the Japanese Patent Office on Jun. 26, 2013 are entirely incorporated herein by reference.

What is claimed is:

1. A handwriting input system for determining a designated position which is designated by a user on a display plane, the designated position being associated with a plurality of dot marks, the plurality of dot marks being a part of a great number of dot marks on the display plane and being formed with respect to a plurality of virtual points, a position of one of the plurality of dot marks being coded by the plurality of dot marks, and the handwriting input system specifying the designated position by reading the plurality of dot marks; the handwriting input system comprising:

an image sensor configured to capture an image of the plurality of dot marks;

dot mark position detecting circuitry configured to detect positions of the plurality of dot marks in an image which has been captured as positions in a first coordinate system of the image;

decoding circuitry configured to generate relative position information based on the positions of the plurality of dot marks which is detected by the dot mark position detecting circuitry and positions of the plurality of virtual points, wherein a second coordinate system different from the first coordinate system is defined by the plurality of virtual points, the relative position information represents a positional relationship of a plurality of dot marks in the second coordinate system with respect to the plurality of virtual points, and the plurality of dot marks in the second coordinate system correspond to the plurality of dot marks in the first coordinate system; and position information calculating circuitry configured to calculate the positions of the plurality of dot marks based on the relative position information;

wherein the decoding circuitry is configured to:

set initial values of relative positions of the plurality of dot marks with respect to the plurality of virtual points;

then execute a calculation process of calculating a projective transformation matrix based on the positions of the plurality of dot marks in the first coordinate system and positions obtained by adding the relative positions to the positions of the virtual points;

execute a transformation process of transforming the positions of the plurality of dot marks from the positions in the first coordinate system to the positions in the second coordinate system by use of the projective transformation matrix;

execute a generation process of generating the relative position information based on post-transformation positions of the plurality of dot marks and the positions of the virtual points;

execute an update process of updating the relative positions in accordance with the relative position information; and sequentially execute the calculation process, the transformation process, the generation process and the update process in repetition until a prescribed condition is fulfilled.

2. The handwriting input system of claim 1, wherein when the number of times of repetition is less than a prescribed value, the decoding circuitry, after executing the update process, executes an invalidation process of invalidating the update process performed on the relative positions of specific virtual points among the plurality of virtual points.

3. The handwriting input system of claim 1, wherein the decoding circuitry sequentially executes the calculation process, the transformation process, the generation process and the update process in repetition until the number of times of repetition reaches a prescribed value.

4. The handwriting input system of claim 1, wherein the decoding circuitry sequentially executes the calculation process, the transformation process, the generation process and the update process in repetition until a result of generation of the relative position information stops changing.

5. The handwriting input system of claim 1, further comprising lattice position setting circuitry configured to set positions of the plurality of virtual points.

6. The handwriting input system of claim 2, wherein the plurality of virtual points in the second coordinate system are located in an m×m lattice, and the specific virtual points are four points at four corners of the m×m lattice, wherein m is an integer greater than 0.

7. The handwriting input system of claim 1, further comprising a pen configured to designate a position on the display plane;

wherein the position information calculating circuitry calculates the designated position based on a position of the pen in the second coordinate system, obtained by transforming a position of the pen in the first coordinate system by use of the projective transformation matrix, and the relative position information.

8. A handwriting input system for determining a designated position which is designated by a user on a display plane, the designated position being associated with a plurality of dot marks, the plurality of dot marks being a part of a great number of dot marks on the display plane and being formed with respect to a plurality of virtual points, a position of one of the plurality of dot marks being coded by the plurality of dot marks, and the handwriting input system specifying the designated position by reading the plurality of dot marks; the handwriting input system comprising:

an image sensor configured to capture an image of the plurality of dot marks;

dot mark position detecting circuitry configured to detect positions of the plurality of dot marks in an image which has been captured;

decoding circuitry configured to generate relative position information based on the positions of the plurality of dot marks which is detected by the dot mark position detecting circuitry and positions of the plurality of virtual points, wherein the relative position information represents a positional relationship of a plurality of dot marks on the display plane with respect to the plurality of virtual points, and the plurality of dot marks on the display plane correspond to the plurality of dot marks in the captured image; and position information calculating circuitry configured to calculate the positions of the plurality of dot marks based on the relative position information;

wherein the decoding circuitry is configured to:
set initial values of relative positions of the plurality of dot marks with respect to the plurality of virtual points;
then execute a calculation process of calculating a transformation matrix based on the positions of the plurality of dot marks in the captured image and positions obtained by adding the relative positions to the positions of the virtual points;
execute a transformation process of transforming the positions of the plurality of dot marks from the positions in the captured image to the positions on the display plane by use of the transformation matrix;
execute a generation process of generating the relative position information based on post-transformation positions of the plurality of dot marks and the positions of the virtual points;
execute an update process of updating the relative positions in accordance with the relative position information; and
sequentially execute the calculation process, the transformation process, the generation process and the update process in repetition until a prescribed condition is fulfilled.

* * * * *